United States Patent
Yaoya

(10) Patent No.: US 6,512,920 B1
(45) Date of Patent: Jan. 28, 2003

(54) SATELLITE COMMUNICATIONS SYSTEM AND HANDOVER PROCESSING METHOD

(75) Inventor: Naoko Yaoya, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/564,775

(22) Filed: May 4, 2000

(30) Foreign Application Priority Data

May 6, 1999 (JP) .......................................... 11-125446

(51) Int. Cl.[7] .................................................. H04Q 7/20
(52) U.S. Cl. ...................................... 455/428; 455/427
(58) Field of Search ................................ 455/427, 428, 455/430, 436–439, 12.1, 13.1–13.3

(56) References Cited

U.S. PATENT DOCUMENTS

| | | | | |
|---|---|---|---|---|
| 5,408,237 A | * | 4/1995 | Patterson et al. | 342/354 |
| 5,483,664 A | * | 1/1996 | Moritz et al. | 455/13.1 |
| 5,625,867 A | * | 4/1997 | Rouffet et al. | 455/13.1 |
| 5,752,187 A | * | 5/1998 | Frank et al. | 455/428 |
| 5,884,164 A | * | 3/1999 | Gerard et al. | 455/428 |
| 5,920,804 A | * | 7/1999 | Armbruster et al. | 455/13.2 |
| 5,999,797 A | * | 12/1999 | Zancho et al. | 455/12.1 |
| 6,073,020 A | * | 6/2000 | Andresen | 455/436 |
| 6,108,538 A | * | 8/2000 | Blasiak et al. | 455/428 |
| 6,122,507 A | * | 9/2000 | Gerard et al. | 455/428 |
| 6,138,021 A | * | 10/2000 | Arrington, Jr. et al. | 455/436 |
| 6,246,874 B1 | * | 6/2001 | Voce | 455/428 |

FOREIGN PATENT DOCUMENTS

JP          10-108267          4/1998

\* cited by examiner

*Primary Examiner*—Daniel Hunter
*Assistant Examiner*—Tuan Tran
(74) *Attorney, Agent, or Firm*—Sughrue Mion, PLLC

(57) ABSTRACT

A handover processing method in a satellite communications system allowing stable and reliable handover process is disclosed. Schedule information is previously registered in each of the satellites. The schedule information of each satellite includes a radius of a coverage area thereof, a point of time provided thereto, and physical locations of a center point of the coverage area thereof according to the point of time. A handover start time is calculated based on the schedule information and the physical location of a mobile station. A control signal regarding the handover start time is transmitted to an adjacent satellite. Since the handover start time is known in advance at both the first satellite and the adjacent satellite, the handover can be performed and completed between them without sending handover request signal.

49 Claims, 14 Drawing Sheets

FIG. 5
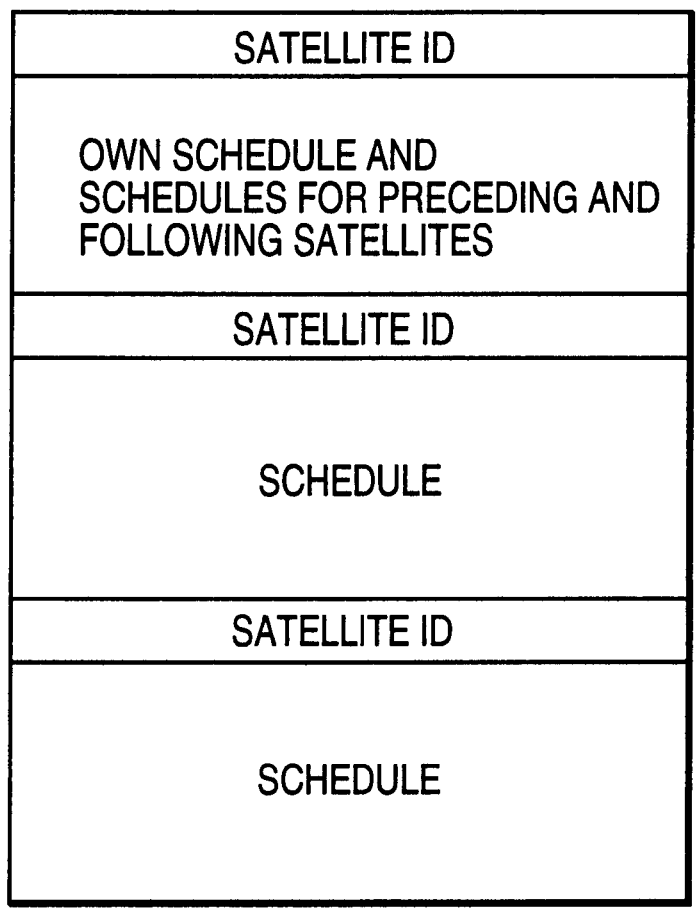
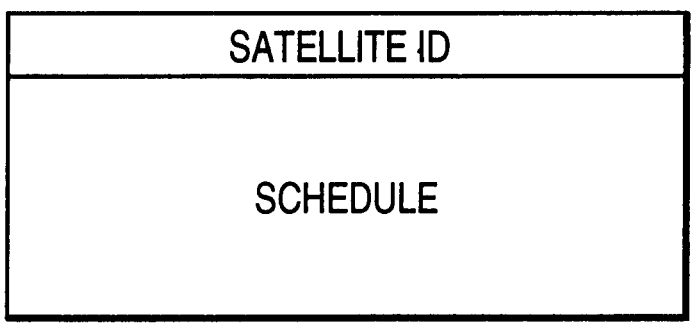

FIG. 10
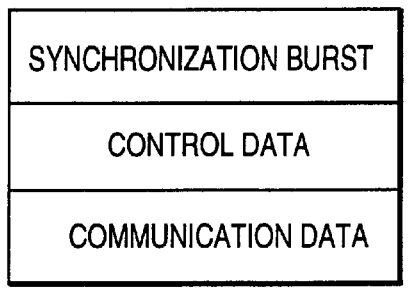
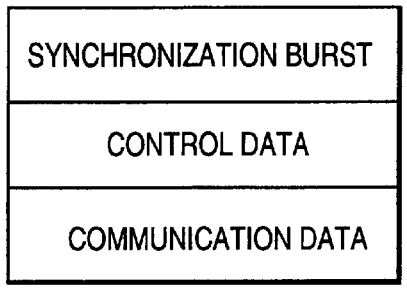
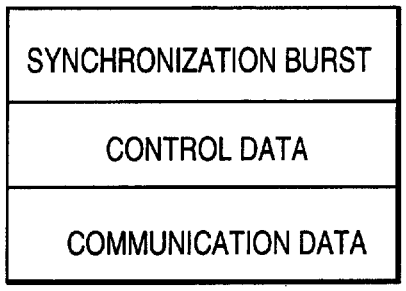
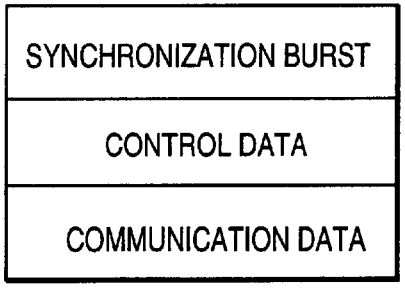

SATELLITE COMMUNICATIONS SYSTEM AND HANDOVER PROCESSING METHOD

BACKGROUND OF THE INVENTION

1. Field of the Invention

The present invention relates to a satellite communications system and its handover processing method, and in particular, to a satellite communications system using a group of orbital satellites according to a satellite fixed cell scheme, as well as a handover processing method therefor.

2. Description of the Prior Art

In the current satellite communications system using a group of orbital satellites, a plurality of satellites are arranged around the earth so as to revolve around it along certain orbits. One of known systems that are adapted for such a satellite communications system uses a group of low-orbital satellites that are principally non-stationary orbital satellites such as iridium satellites or global stars which operate on low earth orbits (LEO).

For example, iridium satellites revolve along six orbits that are substantially orthogonal with the equator. Eleven satellites are located on a single orbit so as to construct a cellular telephone network in which a total of 66 satellites cover every area of the earth. A variety of control centers (hereafter referred to as "ground stations") on the earth monitor the satellite network, transmit instructions for attitude control, and inform each satellite of necessary information. An iridium system satellite has a switching function and an intersatellite communication function. If a user makes a telephone call from an iridium terminal to a public telephone network, a radio wave originated from the iridium terminal is first received by an overhead satellite and then passes through adjacent satellites to reach a gateway connected to a destined telephone network. The call further passes through the telephone network connected to the gateway before connecting to the destination.

In the case where a user makes a call from an iridium terminal to a subscriber telephone connected to a public telephone network, a call setup request is first sent to the nearest gateway. This is to authenticate this iridium terminal. Upon identifying the iridium terminal, the gateway then identifies a gateway corresponding to the destination, and delivers the setup request to this gateway via a satellite circuit. The gateway that has received the connection request identifies the destination and makes a call to a corresponding subscriber telephone network to make a connection. When the destination receives the call, it connects to a communication path joining the satellites together and then starts communication. If the iridium terminal is connected to a telephone connected to a public telephone network, the call setup processing involves two gateways.

In the case of communication between iridium terminals, the satellites also provide a switching function and a communication function. Switching processing, however, is not carried out only by the satellites but connections are always made through a circuit connection procedure via gateways.

The orbits of iridium satellites are as described above. Each of the satellites arranged on these orbits covers the overall global surface using beams impinging on the surface of the earth. A plurality of such communication beams emitted from a satellite cooperate with one another to form a coverage area of the global surface. Since the coverage area is formed by non-stationary orbital satellites, it moves relative to the global surface over time. When the iridium terminal is located in the area of a certain overhead satellite, it can connect to another terminal in the same area or to a public telephone network via a gateway in the same area. Alternatively, when the iridium terminal is to be connected to another iridium terminal or a public telephone network that belongs to a different area, a call is set up via an intersatellite communication link established with an adjacent satellite.

The coverage area formed by a plurality of beams from a satellite in corporation is formed of subsections each formed by a corresponding one of the plural beams. By dividing the coverage area into the subsections, the number of communication channels available in the system can be increased to augment the entire capacity (that is, the number of mobile stations that can be supported by the system).

Likewise, each subsection formed by a plurality of cover beams emitted by satellites corresponds to one dynamic geographical area (cell) that moves over the ground surface as the satellite obits the earth. A coverage beam emitted to each cell is assigned a particular frequency as a communication carrier, and each carrier frequency supports a plurality of channels, which each channel assigned to a specific terminal located within the cell. A terminal can communicate with a satellite at an assigned frequency on an assigned communication channel as long as this terminal is located within the associated cell.

When, however, the terminal leaves an old beam/cell and enters a new beam/cell, this terminal must be assigned a new communication channel. In addition, this terminal must adjust its communication frequency to the frequency associated with the new cell. Otherwise, the current communication channel (an ongoing call) will be dropped (that is, disconnected). Once the terminal has entered the new beam/cell, it uses the new channel for all communications with the satellite.

In addition, of course, such switching of communication channels is required not only within the same satellite but also between satellites. In a satellite communications system principally using a group of low-orbital satellites as described above, a terminal may shift from a satellite by which it is being serviced to a service area of a next satellite, and in this case, it must also switch to a new communication channel.

The process of switching channels carried out in this aspect is called "handover." Handovers are necessary when a mobile station moves from one beam or cell to another beam or cell, and in order to carry out handover, the mobile station must switch to a new predetermined transmission or reception frequency.

In the handover process carried out in a conventional mobile communication system, when a terminal determines the necessity of handover, for example, depending on the intensity of electric field received from a satellite, it sends a handover request signal to a gateway belonging to a service area for the terminal or directly to the satellite. Then, the gateway or satellite that has received this signal transmits and receives information to and from the satellite or gateway, respectively, in order to switch to a new channel to the terminal.

To achieve a smooth handover process, timings when handover becomes necessary are preferably known beforehand. For example, as an example of a conventional technique relating to the handover process, a gateway makes analysis based on a report generated by a terminal as appropriate, and if a power level contained in the report has a predetermined threshold or lower, the gateway determines that the terminal is leaving the current coverage area and recognizes that the handover process will be required in the near future. In an alternative known technique, the gateway continuously monitors the position of the terminal and the position of an associated coverage beam to determine a timing when handover becomes necessary. The gateway, which has used the above method to recognize the timing when handover is to be carried out, transmits signals with appropriate timings starting with the handover request signal to establish a new channel between a corresponding satellite and the terminal.

Handover in the conventional intersatellite communications system will be described with reference to the sequence diagram shown in FIGS. 1 and 2.

With reference to FIG. 1, handover between a first satellite and a second satellite following the first satellite on the same orbit will be described. A ground station controls all the satellites such that a controller of each satellite is caused to register via its receiver a physical location immediately below the navigating satellite (the east longitude, the north latitude, or the like), a schedule indicating the corresponding point of time, physical locations immediately below satellites preceding or following the first satellite on its orbit (the east longitude, the north latitude, or the like), and a schedule indicating the corresponding point of time (B1, B2).

When the terminal determines that handover is necessary, for example, depending on the intensity of electric field received from a satellite, it sends a handover request signal to a gateway belonging to a service area for the terminal or directly to the first satellite (B3). Upon receiving the handover request signal, the first satellite starts handover processing via an intersatellite communication link (B4) and transmits a downlink message for the terminal to a second satellite (B5).

The first satellite transmits the last communication data via a communication link established with the terminal (B6), and the second satellite transmits the first communication data (B7). Once a new up-link has been established between the terminal and the second satellite, the terminal transmits the last communication data to the first satellite (B8) and then transmits the first communication data to the second satellite (B9).

With reference to FIG. 2, handovers will be described which are executed in response to a handover request signal received from the terminal in the order: a third satellite, a first satellite, and a second satellite, which are arranged on the same orbit. A ground station controls all the satellites such that a controller of each satellite is caused to register via its receiver a physical location immediately below the navigating satellite (the east longitude, the north latitude, or the like), a schedule indicating the corresponding point of time, physical locations immediately below satellites preceding or following the first satellite on its orbit (the east longitude, the north latitude, or the like), and a schedule indicating the corresponding point of time (B11, B12, B13).

When a terminal covered by the third satellite determines the necessity of handover, for example, depending on the intensity of electric field received from the third satellite, it sends a handover request signal to a gateway belonging to a service area for the terminal or directly to the third satellite (B14). Upon receiving the handover request signal, the third satellite starts the handover procedure for the first satellite via an intersatellite communication link (B15).

When a terminal covered by the first satellite determines the necessity of handover, for example, depending on the intensity of electric field received from the first satellite, it sends a handover request signal to a gateway belonging to a service area for the terminal or directly to the first satellite (B16). Upon receiving the handover request signal, the first satellite starts handover for the second satellite via an intersatellite communication link (B17), and the first satellite executes transmissions to the second satellite (B18). The first satellite transmits the last communication data via the established communication link (B19), while the second satellite transmits the first communication data via a link newly established with the terminal (B20).

In the handover process of the above satellite communications system, a large amount of information is communicated, so that a large amount of time is required to complete this process. Consequently, the resulting adverse effects on communication cannot be avoided.

Further, in the handover process which is started depending on, for instance, the intensity of electric field received from a satellite, it is necessary to include information indicating that the handover is started in the notice to be sent to a gateway or a satellite, resulting in a large amount of data to be transmitted.

Furthermore, an incidental factor may cause the handover process to be started, resulting in unexpected and unavoidable communication failure.

There has been disclosed a satellite-based telecommunications system, which performs scheduled handovers, enabling faster handover process and minimizing interrupts due to the handover process, in Japanese Patent Application Unexamined Publication No. 10-108267.

SUMMARY OF THE INVENTION

An object of the present invention is to provide satellite communications system and handover processing method that can achieve the stable and reliable handover process.

According to the present invention, schedule information is previously registered in each of the satellites. The schedule information of each satellite includes a radius of a coverage area thereof, a point of time provided thereto, and physical locations of a center point of the coverage area thereof according to the point of time. After determining a physical location of a first station which is located in a first coverage area of a first satellite, a handover start time is calculated based on the schedule information and the physical location of the first station and a control signal regarding the handover is transmitted to an adjacent satellite. Since the handover start time is known in advance at both the first satellite and the adjacent satellite, the handover can be performed and completed between them without sending handover request signal.

According to a first aspect of the present invention, a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites comprising: a ground communication section for communicating with stations located in the coverage areas on the earth; an intersatellite communication section for communicating with other satellites through intersatellite communications links; and a controller controlling the ground and intersatellite communication sections to perform a handover process, wherein in a first satellite forming a coverage area in which the station is located, a first controller calculates a handover start time at which the handover process should be started for the station, and controls the intersatellite communication section so as to transmit a control signal having a handover completion time added thereto to an adjacent satellite that is to be a handover destination satellite, wherein the handover completion time is calculated from the handover start time, and in a second satellite receiving the control signal having the handover completion time added thereto from the first satellite, a second controller performs the handover process by establishing a new communication link to the station before the handover completion time.

According to a second aspect of the present invention, in a first satellite forming a coverage area in which the station is located, a first controller calculates a handover start time at which the handover process should be started for the station, and controls a first intersatellite communication section so as to transmit a control signal having a handover completion time added thereto and communication data received from the station at the handover start time and having next handover-related data added thereto to an adjacent satellite that is to be a handover destination satellite, wherein the handover completion time is calculated from the handover start time, and in a second satellite receiving from the first satellite the control signal having the handover completion time added thereto and the communication data having the next handover-related data added thereto, a second controller performs the handover process by establishing a new communication link to the station before the handover completion time, compares communication data received from the station using the new communication link with the next handover-related data to determine whether the communication data and the next handover-related data are in sequence, and controls second ground and intersatellite communication sections such that a sequence of communication data is received from the station and is transmitted toward an opposite-side station communicating with the station.

According to a third aspect of the present invention, a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite, each of the satellites comprising: a ground communication section for communicating with stations on the earth; an intersatellite communication section for communicating with other satellites through intersatellite communications links; a storage device for storing data received from other satellites through the intersatellite communications links; a selector for selecting one of data received by the ground communication section and data stored in the storage device; and a controller controlling the ground and intersatellite communication sections and the selector to perform a handover process, wherein in a first satellite forming a coverage area in which the station is located, a first controller calculates a handover start time T−t at which the handover process should be started for the station, wherein T is a handover completion time and t is a time required for the handover process, and controls a first intersatellite communication section so as to transmit a control signal having the handover completion time T added thereto and communication data received from the station at the handover start time T−t and having next handover-related data added thereto to an adjacent satellite that is to be a handover destination satellite, wherein the handover completion time T is calculated from the handover start time T−t, and in a second satellite receiving from the first satellite the control signal having the handover completion time T added thereto and the communication data having the next handover-related data added thereto, a second controller performs the handover process by establishing a new communication link to the station before a lapse of the handover completion time T, inputing data from the second ground communication section using the new communication link, inputting data from a second storage device when the selector is switched by the second intersatellite communication section at the handover completion time T, comparing communication data received from the station using the new communication link with the next handover-related data to determine whether the communication data and the next handover-related data are in sequence, and controls second ground and intersatellite communication sections such that a sequence of communication data is received from the station and is transmitted toward an opposite-side station communicating with the station.

According to a fourth aspect of the present invention, a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites comprising: a ground communication section for communicating with stations located in the coverage areas on the earth; an intersatellite communication section for communicating with other satellites through intersatellite communications links; and a controller controlling the ground and intersatellite communication sections to perform a handover process, wherein in a first satellite forming a coverage area in which a station is located, a first controller calculates a handover start time at which the handover process should be started for the station, and controls the intersatellite communication section so as to transmit a control signal having a handover completion time added thereto to a second satellite that is to be a handover destination satellite adjacent to the first satellite using a first intersatellite communication link and a third satellite which is communicating with the first satellite using a second intersatellite communication link, wherein the handover completion time is calculated from the handover start time, and in the second satellite receiving the control signal having the handover completion time added thereto from the first satellite, a second controller performs the handover process by establishing a new communication link to the station before the handover completion time, receiving communication data from the station using the new communication link, and transmitting the received communication data to the third satellite using a third intersatellite communication link.

According to a fifth aspect of the present invention, a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites comprising: a ground communication section for communicating with stations located in the coverage areas on the earth; an intersatellite communication section for communicating with other satellites through intersatellite communications links; and a controller controlling the ground and intersatellite communication sections to perform a handover process, wherein in a first satellite forming a coverage area in which the station is located, a first controller calculates a handover start time T−t at which the handover process should be started for the station, wherein T is a handover completion time and t is a time required for the handover process, controls a first intersatellite communication section so as to transmit a control signal having the handover completion time T added thereto to a second satellite that is to be a handover destination satellite adjacent to the first satellite using a first intersatellite communication link and a third satellite which is communicating with the first satellite using a second intersatellite communication link, and controls the first intersatellite communication section so as to transmit first communication data having next handover-related data added thereto to the third satellite at the handover star time T−t, wherein the handover completion time is calculated from the handover start time, and in the second satellite receiving the control signal having the handover completion time T added thereto from the first satellite, a second controller performs the handover process by establishing a new communication link to the station before the handover start time T−t, and transmitting second communication data to the third satellite using a third intersatellite communication link, wherein the second communication data is received from the station using the new communication link, in the third satellite receiving the first communication data from the first satellite and the second communication data from the second satellite, a third controller compares the first communication data having the next handover-related data added thereto with the second communication data to determine whether these received communication data are in sequence, and controls third ground and intersatellite communication sections such that a sequence of communication data received from the station is transmitted toward an opposite-side station communicating with the station.

According to the present invention, a handover processing method in a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites including: a ground communication section for communicating with stations located in the coverage areas on the earth; an intersatellite communication section for communicating with other satellites through intersatellite communications links; and a controller controlling the ground and intersatellite communication sections to perform a handover process, the method includes the steps of: at a first satellite forming a coverage area in which the station is located, a) calculating a handover start time at which the handover process should be started for the station; b) transmitting a control signal having a handover completion time added thereto to an adjacent satellite that is to be a handover destination satellite, wherein the handover completion time is calculated from the handover start time; at a second satellite receiving the control signal having the handover completion time added thereto from the first satellite, c) performing the handover process by establishing a new communication link to the station before the handover completion time.

According to another aspect of the present invention, a handover processing method includes the steps of: at a first satellite forming a coverage area in which the station is located, a) calculating a handover start time at which the handover process should be started for the station; b) transmitting a control signal having a handover completion time added thereto and communication data received from the station at the handover start time and having next handover-related data added thereto to an adjacent satellite that is to be a handover destination satellite, wherein the handover completion time is calculated from the handover start time; at a second satellite receiving from the first satellite the control signal having the handover completion time added thereto and the communication data having the next handover-related data added thereto, c) establishing a new communication link to the station before the handover completion time; d) comparing communication data received from the station using the new communication link with the next handover-related data to determine whether the communication data and the next handover-related data are in sequence; e) receiving a sequence of communication data from the station; and f) transmitting the sequence of communication data toward an opposite-side station communicating with the station.

According to still another aspect of the present invention, a handover processing method in a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite, each of the satellites comprising: a ground communication section for communicating with stations on the earth; an intersatellite communication section for communicating with other satellites through intersatellite communications links; a storage device for storing data received from other satellites through the intersatellite communications links; a selector for selecting one of data received by the ground communication section and data stored in the storage device; and a controller controlling the ground and intersatellite communication sections and the selector to perform a handover process, the method includes the steps of: at a first satellite forming a coverage area in which the station is located, a) calculating a handover start time T−t at which the handover process should be started for the station, wherein T is a handover completion time and t is a time required for the handover process; b) transmitting a control signal having the handover completion time T added thereto and communication data received from the station at the handover start time T−t and having next handover-related data added thereto to an adjacent satellite that is to be a handover destination satellite, wherein the handover completion time T is calculated from the handover start time T−t; at a second satellite receiving from the first satellite the control signal having the handover completion time T added thereto and the communication data having the next handover-related data added thereto, c) establishing a new communication link to the station before a lapse of the handover completion time T, d) inputing data from the second ground communication section using the new communication link; e) inputting data from a second storage device when the selector is switched by the second intersatellite communication section at the handover completion time T; f) comparing communication data received from the station using the new communication link with the next handover-related data to determine whether the communication data and the next handover-related data are in sequence; g) receiving a sequence of communication data from the station; and h) transmitting the sequence of communication data toward an opposite-side station communicating with the station.

According to further another aspect of the present invention, a handover processing method in a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites comprising: a ground communication section for communicating with stations located in the coverage areas on the earth; an intersatellite communication section for communicating with other satellites through intersatellite communications links; and a controller controlling the ground and intersatellite communication sections to perform a handover process, the method includes the steps of: at a first satellite forming a coverage area in which a station is located, a) calculating a handover start time at which the handover process should be started for the station; b) transmitting a control signal having a handover completion time added thereto to a second satellite that is to be a handover destination satellite adjacent to the first satellite using a first intersatellite communication link and a third satellite which is communicating with the first satellite using a second intersatellite communication link, wherein the handover completion time is calculated from the handover start time; at the second satellite receiving the control signal having the handover completion time added thereto from the first satellite, c) performing the handover process by establishing a new communication link to the station before the handover completion time; d) receiving communication data from the station using the new communication link; and e) transmitting the received communication data to the third satellite using a third intersatellite communication link.

According to still further another aspect of the present invention, a handover processing method in a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites comprising: a ground communication section for communicating with stations located in the coverage areas on the earth; an intersatellite communication section for communicating with other satellites through intersatellite communications links; and a controller controlling the ground and intersatellite communication sections to perform a handover process, the method includes the steps of: at a first satellite forming a coverage area in which the station is located, a) calculating a handover start time T–t at which the handover process should be started for the station, wherein T is a handover completion time and t is a time required for the handover process; b) transmitting a control signal having the handover completion time T added thereto to a second satellite that is to be a handover destination satellite adjacent to the first satellite using a first intersatellite communication link and a third satellite which is communicating with the first satellite using a second intersatellite communication link; c) transmitting first communication data having next handover-related data added thereto to the third satellite at the handover star time T–t, wherein the handover completion time is calculated from the handover start time; at the second satellite receiving the control signal having the handover completion time T added thereto from the first satellite, d) establishing a new communication link to the station before the handover start time T–t; e) transmitting second communication data to the third satellite using a third intersatellite communication link, wherein the second communication data is received from the station using the new communication link; at the third satellite receiving the first communication data from the first satellite and the second communication data from the second satellite, f) comparing the first communication data having the next handover-related data added thereto with the second communication data to determine whether these received communication data are in sequence; and g) transmitting a sequence of communication data received from the station toward an opposite-side station communicating with the station.

BRIEF DESCRIPTION OF THE DRAWINGS

FIG. 5 is a schematic diagram showing schedule information communicated from a ground station according to an embodiment of the present invention;

FIG. 10 is a diagram showing a general configuration of communication data transmitted via an intersatellite communication link according to an embodiment of the present invention;

DETAILED DESCRIPTION OF THE PREFERRED EMBODIMENTS

Embodiments of the present invention will be described below in detail with reference to the drawings.

Figure 3:
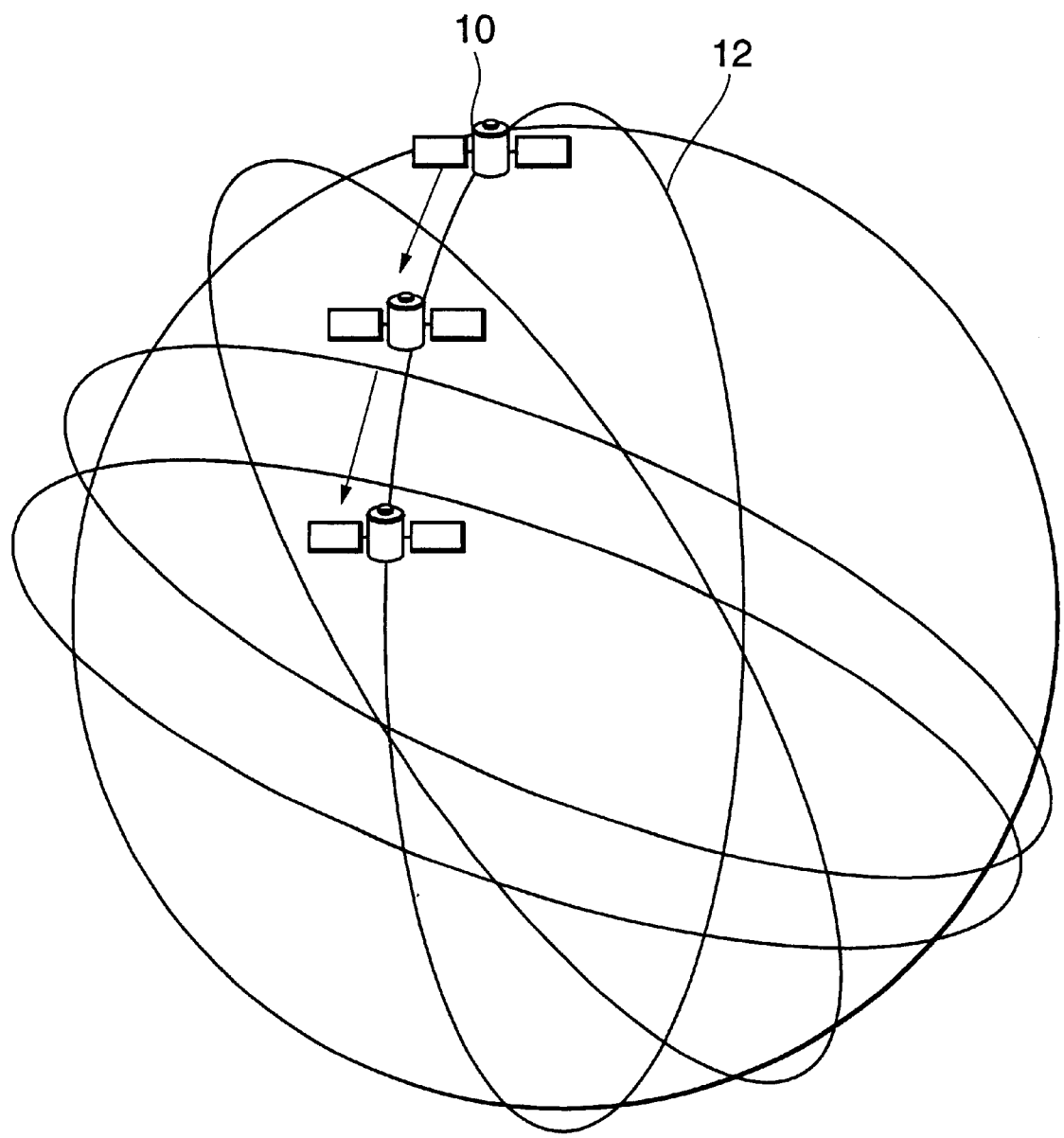
FIG. 3 is a schematic diagram showing satellite orbits for which a satellite communications system according to the present invention is used.

FIG. 3 shows an arrangement of low-orbital satellites that is a precondition for the present invention. Here, a simple case is shown including plural orbits 12 that are planes each extending at a given angle from the equatorial plane, that cross one another at a given angle, and that are set so as to cover the surface of the earth, and also including plural low-orbital satellites arranged on the same orbit so that areas covered by these low-orbital satellites cover the circumference of the earth.

The present invention is applicable to a mobile communication system using non-stationary orbital satellites represented by iridium satellites or global stars and operating on LEOs (Low Earth Orbits). The altitude of the orbit is not limited in the case where a mobile communication system uses a plurality of non-stationary orbital satellites arranged on the same orbit, and the present invention is also applicable, for example, to a mobile communication system such as INMARSAT-P et al. which operates on an MEO (Medium Earth Orbit).

In addition, a satellite communications system has two possible types of orbits. One of these types of orbits is polar orbits each having a plane passing through either of the poles (in the case of sun synchronous orbits, quasi-polar orbits) and which are characterized by ensuring the permanent and overall coverage of the earth. The other of the types of orbits is inclined orbits each having a plane inclined at a given angle (actually 60° or smaller) relative to the equatorial plane. In this case, the permanent coverage is comprised of two boundary zones that are parallel with the equator and that are symmetrical with respect to the equator.

With respect to these two types of orbits for the satellite communications system, the present invention is applicable to either of the two types of orbits if only the mobile communication system uses a plurality of satellites 10 arranged on the same orbit.

Figure 4:
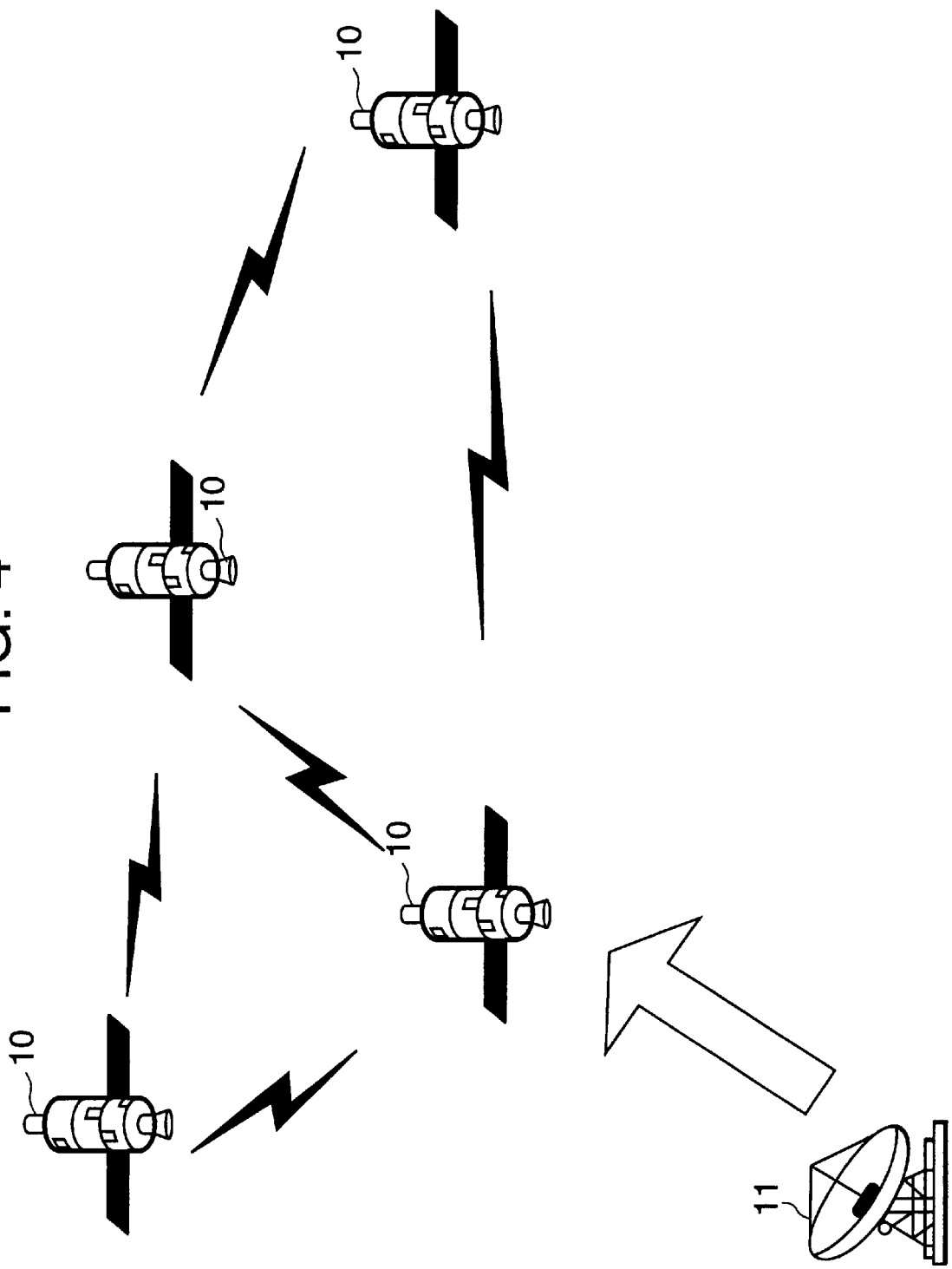
FIG. 4 is a schematic diagram showing communications between a ground station and satellites in an intersatellite communications system according to an embodiment of the present invention.

FIG. 4 shows a general configuration of a form of communication between a ground station 11 existing on the earth and satellites 10.

According to a first embodiment of the present invention, the ground station 11 controls each of the satellites 10 so as to synchronize timers of these satellites 10 with one another. The timers can be synchronized with one another using intersatellite communication links established between the satellites and based on synchronization bursts transmitted between the satellites. In addition, the ground station 11 has each of the satellites 10 to register in its controller, physical locations (east longitude, north latitude, or the like) immediately below satellites 10 navigating before and after the first satellite 10 on the same orbit, a schedule indicating the corresponding point of time, physical locations (east longitude, north latitude, or the like) immediately below satellites 10 navigating adjacent to the first satellite 10, and a schedule indicating the corresponding point of time.

Based on a point of time indicated by the timers, which synchronize with the schedules registered by the ground station 11 before the start of service, each of the satellites 10 can determine its own current location, the current locations of the satellites 10 preceding and following this satellite 10 on the same orbit, and the current locations of the other adjacent satellites 10.

As shown in FIG. 3, the schedule information provided by the ground station 11 is comprised of satellite IDs for identifying each satellite 10, a navigation schedule for a satellite holding a desired satellite ID, navigation schedules for satellites 10 preceding and following this satellite 10, and navigation schedules for other adjacent satellites 10 (not shown).

According to a second embodiment of the present invention, each satellite 10 can register the above schedule information beforehand, and based on a point of time indicated by the timer, which synchronizes with the previously registered, each satellite 10 can determine its own current location, the current locations of satellites 10 preceding and following this satellite 10 on the same orbit, and the current locations of other adjacent satellites 10.

Figure 6:
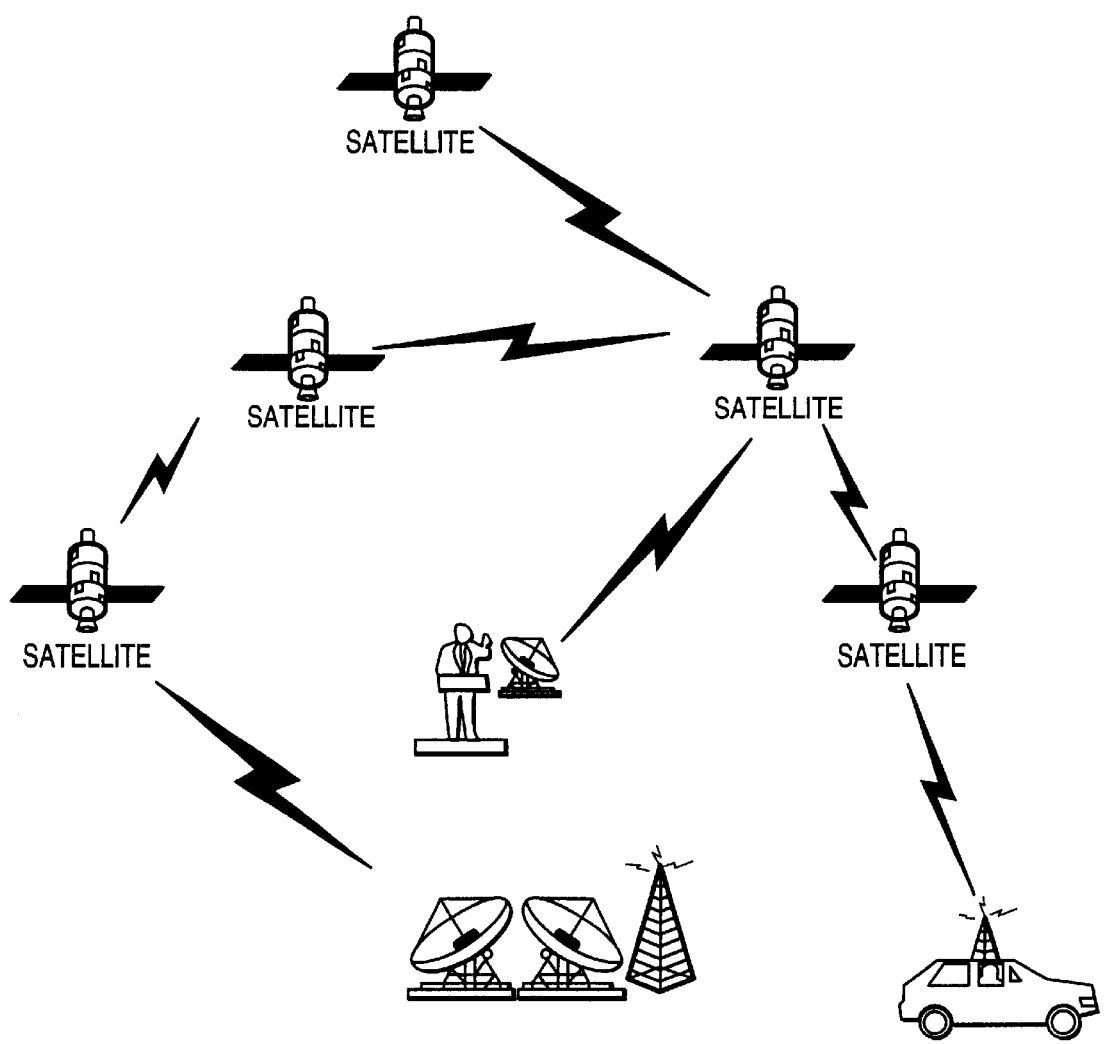
FIG. 6 is a schematic diagram showing an example of a configuration of a satellite communications system according to the present invention.

FIG. 6 is a schematic diagram showing an example of a configuration of a satellite communications system according to the present invention. Each satellite 10 can communicate with an adjacent satellite 10 via an intersatellite communication link and can transmit communication data received from a covered subscriber to a destined subscriber via other adjacent satellites 10.

According to the present invention, communication data transmitted between the satellites 10 additionally includes a control signal required for handover so that satellites 10 involved in this process can autonomously start it. In addition, each satellite 10 determines the location of a subscriber who is transmitting communication data after establishing a communication link.

As a means by which the satellite 10 can determine the location of a subscriber, the satellite 10 can use location information for each subscriber identification (ID) which is contained in call setup information transmitted from the ground station 11 when the subscriber attempts to set up a call.

As another means by which the satellite 10 can determine the location of a subscriber, a GPS system can be used which determines the location by receiving radio waves from a group of stationary orbital satellites. In this case, the satellite 10 can determine the location of a subscriber by receiving location information on the subscriber from the GPS system.

As yet another means by which the satellite 10 can determine the location of a subscriber, the satellite 10 can use a receiver for receiving and analyzing radio waves from the ground, to analyze which of plural beam frequencies emitted by the satellite matches the frequency of a channel established with a subscriber belonging to a currently covered area, and can then determine the location of the subscriber using a controller for controlling the functions of the satellite 10.

According to the present invention, however, the means for determining the location of a subscriber is not limited to the above ones but any of the conventional techniques may be used if only the satellite 10 can determine the location of the subscriber.

Handover Start Time Calculation

Although the orbital satellite according to the present invention can use the above means to determine the location of a subscriber, the present invention is characterized in that based on the location of a subscriber determined by each satellite 10 and on the schedule information registered in the controller, a handover start time for the subscriber with its location determined can be autonomously calculated. A method for calculating the handover start time will be described below.

All the satellites 10 each have the previously registered size of an area covered by its own beams, and can calculate the amount of time required for the location of a subscriber to leave the area covered by this satellite by referring to its own navigation schedule registered in the controller thereof by the ground station 11.

In addition, the schedule information provided to all the satellites includes the navigation schedules for adjacent satellites 10, so that each satellite can calculate the amount of time required for the subscriber to enter an area covered by an adjacent satellite.

Then, the point of time when the subscriber leaves the current coverage area is defined as TA, the amount of time required for the coverage area of the following satellite 10 to cover the current location of the subscriber is defined as TB, and the amount of time required for the handover process is defined, for example, as 1. If TA meets the following condition:

$$TA > TB + 1 \qquad (1)$$

and when the handover process is started at TA−1, this handover process is completed after the passage of the amount of time TA required for location of the subscriber to leave the coverage area of the overhead satellite 10.

If a handover destination satellite 10 is the satellite 10 following the overhead satellite on the same orbit, since the schedules provided by the ground station 11 includes the schedule for the following satellite 10, the satellite 10 preceding this satellite, which acts as a handover source, can measure the amount of time required for the subscriber, who currently has an established communication link with the overhead satellite 10, to enter the area covered by the following satellite 10.

In this case, the point of time when the subscriber passes through the coverage area can be calculated by registering in the controller of the handover source satellite 10, the movement speed and size of the coverage area that is irradiated with beams. This method can calculate the amount of time required for the location of the subscriber to leave the coverage area of the overhead satellite without depending on the schedule for the overhead satellite given by the ground station 11 as described above.

In other words, this method can measure the length of a straight line joining the location of the one identified subscriber with the intersection between the edge of the coverage area and a straight line passing through the location of the subscriber and parallel with the movement direction of the coverage area, that is, the distance the subscriber moves on the current coverage area. Since the controller has the movement speed of the coverage area registered therein, the distance the subscriber moves can be divided by the movement speed of the coverage area to calculate the amount of time required for the location of the subscriber to leave the coverage area of the overhead satellite.

Figure 7:
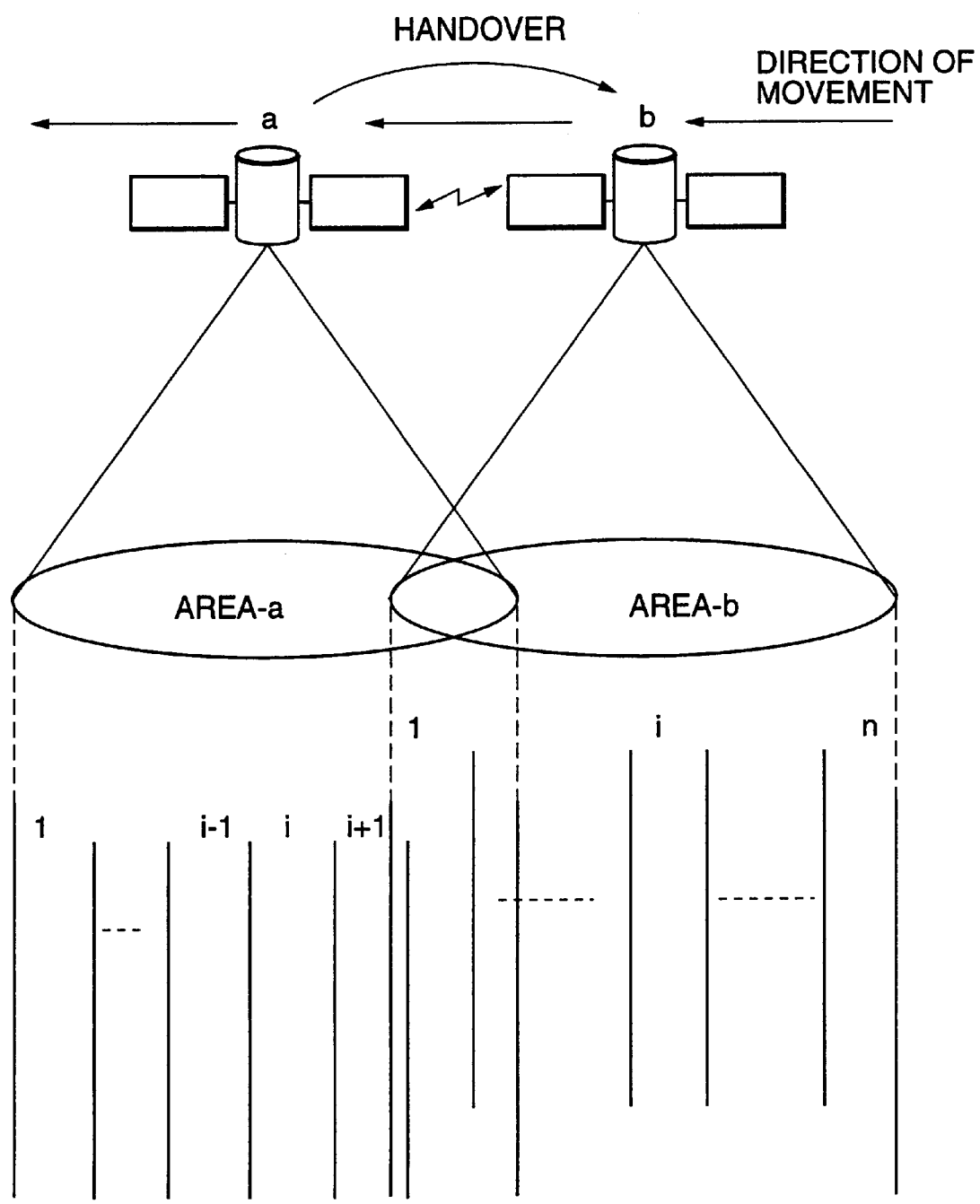
FIG. 7 is a diagram showing means for calculating a handover start time according to an embodiment of the present invention.

As shown in FIG. 7, in the case where the handover destination satellite is the satellite 10 following the overhead satellite on the same orbit, the area covered by this satellite 10 is equally divided in a direction perpendicular to the forwarding direction of the coverage area. If a subscriber belongs to a location meeting the above conditional expression (1), then the time to start the handover process for this subscriber can be calculated by determining which of the divisional areas the subscriber belongs to, as shown in FIG. 7. This method can eliminate the process of calculating the TA and TB for the location of the subscriber, determining whether the conditional expression (1) is satisfied, and then obtaining the time to start the handover process.

As shown in FIG. 7, each satellite 10 uses its receiver to receive and analyze radio waves from the ground station, and adds a reception time T obtained by its timer to communication data sent by a subscriber before transferring the data to its controller. The controller divides the area covered by the orbital satellite into n equal parts (n: 1, 2, ..., i, ..., n) and determines where this mobile station is located, for example, within an area i.

If the area covered by the satellite 10 is assumed to move at a speed v, then t seconds later, this satellite 10 approaches a subscriber who currently has an established link with the preceding orbital satellite navigating before this satellite 10, by a distance v×t from the original location. If, for example, the area covered by each orbital satellite is assumed to have a radius of 1 and the subscriber is located immediately below the current communication orbit, then 1/v time later, the subscriber enters the area covered by the following satellite navigating after the current satellite 10.

The controller of the satellite 10 divides the coverage area into n equal parts (n: 1, 2, ..., i, ..., n), and when the controller determines that a divisional area i is located immediately below the satellite 10, the divisional area i leaves the location immediately below the satellite 1/v time later. Accordingly, data from a subscriber located in the divisional area i is handed 1/v−1 time later to the following satellite 10 navigating after the overhead satellite 10, and the handover process is completed 1/v time later.

That is, by starting the handover process the 1/v−1 time after the time T, the controller completes the handover process the handover time 1 later, at the time 1/v.

In addition, a method for calculating the handover start time will be described below wherein the handover destination satellite 10 is not limited to the satellite 10 following the overhead satellite on the same orbit but is a plurality of adjacent satellites 10.

The amount of time required for a subscriber to leave the coverage area of the currently overhead satellite 10 is defined as Ta, the respective amounts of time required for a plurality of adjacent satellites 10 to reach a location covering this subscriber are defined as Tb, Tc, ..., Tn, and the amount of time required for the handover process is defined to be 1. Adjacent satellites 10 meeting the following condition are retrieved:

$$Ta > Tb + 1, Tc + 1, \ldots, Tn + 1 \qquad (2)$$

As the result of the retrieval, a satellite 10 meeting the conditional expression (2) is determined to be the handover destination satellite 10. The handover process is started time Ta−1 later and completed time Ta later.

Then, when a plurality of satellites 10 meet the above condition, the frequency of the handover process executed during the entire service can be reduced by selecting one of the satellites which has the largest value.

In addition, by extending the range of schedule information on adjacent satellites 10 which is referenced by the overhead satellite, more preferable handover can be scheduled. Although the above embodiment using the conditional expression (1) identifies one handover destination satellite 10, a plurality of preferable handover destination satellites 10 can be identified due to the extension of the range of referenced schedule information on the adjacent satellites 10.

One satellite 10 is assumed to be the handover destination satellite 10 and the amount of time required for this handover destination satellite to cover the location of a subscriber being serviced by the handover source satellite 10 is assumed to be Ti. Since the schedule for this handover destination satellite 10 has been received from the ground station 11, the handover source destination 10 can also calculate a time Ti' from the start of coverage by the handover destination satellite 10 until its coverage area leaves the location of the subscriber, and retrieves again a satellite 10 corresponding to the right side Ti1 of the above conditional expression (2) that can meet the left side thereof. By repeating such processing so that the conditional expression (2) is satisfied and selecting a satellite that has the largest value of Ti+Ti1, . . . , +Tin, the frequency of the handover process executed during the entire service can further be reduced. In this case, the handover process is started Ti−1, Ti1−1, . . . , and Tin−1 later.

Next, a second embodiment of the present invention will be described. As in the first embodiment, the ground station 11 controls each satellite 10 so that the timers included in the satellites 10 are synchronized with one another. The timers can be synchronized with one another using the intersatellite communication links established between the satellites and based on the synchronization burst sent from each satellite. The controller of each satellite previously registers therein a physical location immediately below this navigating satellite 10 (east longitude, north latitude, or the like), a schedule indicating the corresponding time, a physical location immediately below the satellite 10 navigating after the first satellite 10 (east longitude, north latitude, or the like), and a schedule indicating the corresponding time.

Based on a point of time indicated by the timer, which is synchronized with the schedule information previously registered in the controller, each satellite 10 can determine its own current location, the current locations of the satellites 10 preceding and following this satellite on the same orbit, and the current locations of other adjacent satellites 10.

Each satellite 10 can reference its own schedule previously registered in the controller, to calculate the amount of time required for the location of a subscriber to leave the coverage area based on the location of the subscriber determined as in the first embodiment and on the size of the area covered by its own beams and registered in advance.

In addition, the schedule information registered in all the satellites 10 includes navigation schedules for adjacent satellites 10, so that the amount of time required for the location of a subscriber enters the area covered by an adjacent satellite can be calculated.

If the handover destination satellite 10 is the satellite 10 following the overhead satellite on the same orbit, since the schedules received from the ground station 11 includes the schedule for the following satellite 10, the satellite 10 preceding the overhead satellite, which acts as the handover source, can measure the amount of time required for a subscriber who currently has an established communication link with the overhead satellite to enter the area covered by the following satellite 10.

In this case, the point of time when the subscriber passes through the coverage area can also be calculated by registering in the controller, the movement speed and size of the coverage area which is irradiated with beams as in the first embodiment. That is, the point of time when the subscriber passes through the coverage area can be calculated without depending on the schedule information previously registered in the controller.

A specific calculation of the handover start time is similar to that in the first embodiment, and is thus omitted.

In addition, according to the present invention, the above method can be used to determine the handover start time, but the present invention is also applicable to a plurality of areas formed by a plurality of beams emitted by one satellite that uses the multibeam satellite communication system. In this case, the handover start time can be easily calculated by determining the location of a subscriber covered by the one satellite and registering the size of each of the plural areas within this coverage area and the location relationship between these areas.

At the handover start time determined by the above embodiments of the present invention, the satellite 10 starts the handover process for a subscriber within the coverage area. An example of the operation of the handover process according to the present invention will be described below in detail with reference to the accompanying drawings.

Handover Process

Figure 8:
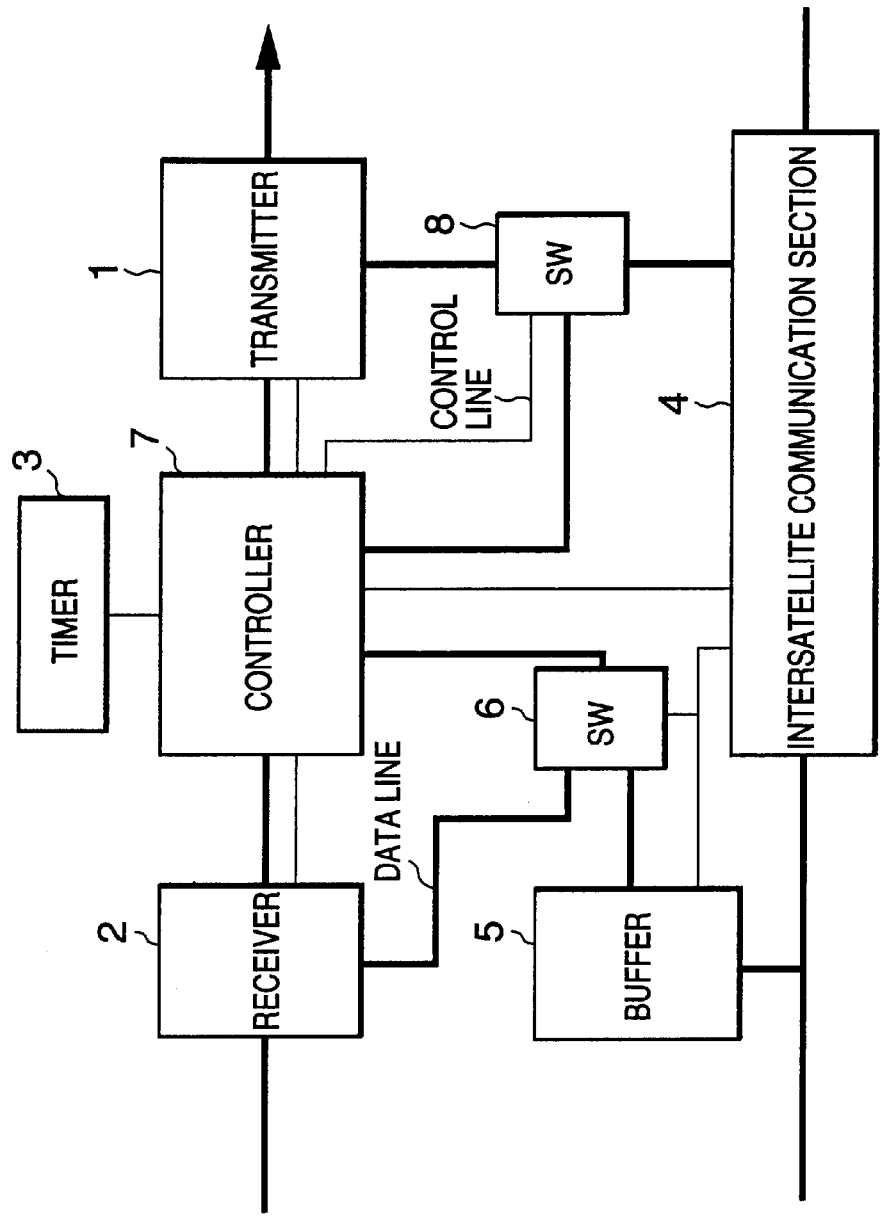
FIG. 8 is a block diagram showing an example of a configuration of a communication unit inside an orbital satellite according to an embodiment of a satellite communications system using a group of orbital satellites of the present invention.

FIG. 8 is a block diagram showing an example of a configuration of a communication unit inside each communication satellite 10 according to an embodiment of the present invention. In FIG. 8, the satellite 10 is comprised of a transmitter 1 for transmitting a radio wave to the ground, a receiver 2 for receiving and analyzing a radio wave from the ground, a timer 3 synchronizing with the timers of the other communication satellites, an intersatellite communication section 4 having a transmitter/receiver for communication between the satellites 10, a data buffer 5 for storing data received from the intersatellite communication sections 4 of other satellites 10 via the intersatellite communication links, switching circuits 6, 8 for switching data transfer, and a controller 7 for controlling these components.

Figure 12:
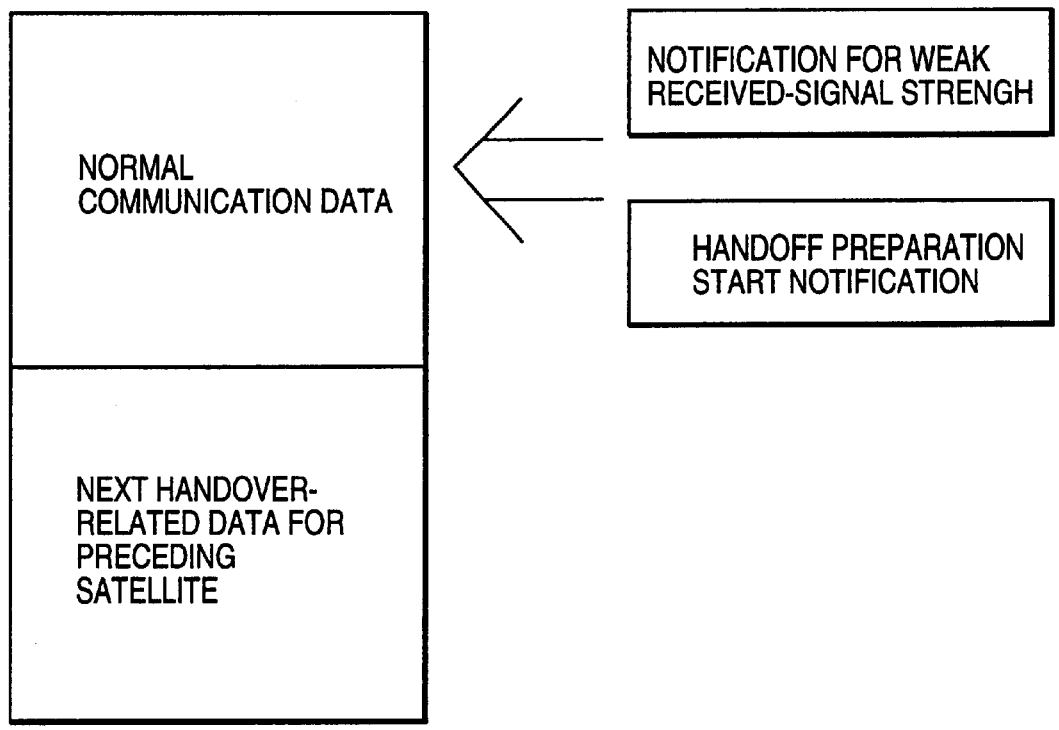
FIG. 12 is a diagram showing information issued during handover preparations according to an embodiment of the present invention.

When the controller 7 calculates the handover start time for a covered subscriber and determines that the time T−1 has passed since the calculation of the handover start time, the satellite 10 issues a handoff preparation start notification, which is shown in FIG. 12, to enter a handoff preparation state, and the intersatellite communication section 4 transmits to the handover destination satellite 10, communication data with next handover-related data added thereto, which is shown in FIG. 12.

In addition, when the controller 7 calculates the handover start time T−1 for the subscriber, the satellite 10 transmits to the adjacent satellite 10 a control signal with a handover completion time T determined based on the calculated handover start time T−1. At this point, the control signal is transmitted from the handover source satellite 10 using the intersatellite communication link, through which communication frames are otherwise transmitted.

Figure 9:
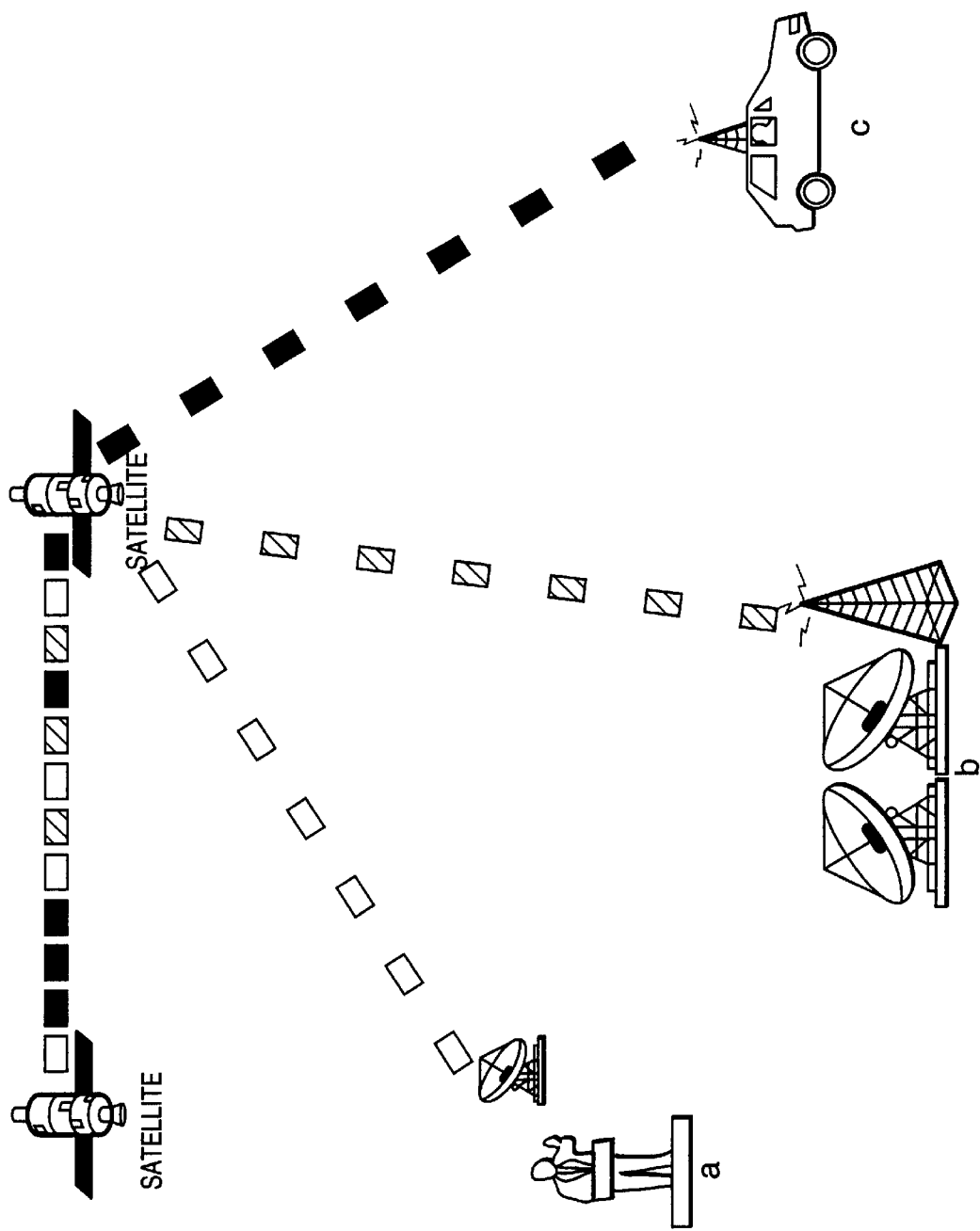
FIG. 9 is a diagram showing an example of a connection method for intersatellite communication according to an embodiment of the present invention.

Referring to FIG. 9, the details will be explained. A signal transmitted between the satellites 10 is comprised of a TDMA frame. Communication frames received from subscribers a, b, c or transmitted thereto are time-division multiplxed, into the intersatellite communication link, for example, a, b, c, a, b, c, . . . When the handover source satellite 10 transmits a control signal to the adjacent satellite 10, a control frame required between the satellites across the intersatellite communication link for each subscriber is added, before transmission, to the TDMA frame, which is provided to each subscriber in the above manner.

The connection scheme for communication between the satellites according to the present invention is not limited to the above TDMA, but any technique can be used if only it can increase the entire capacity of communication.

Referring to FIG. 10, the internal configuration of the communication frame transmitted between the satellites will be described. A frame transmitted through a plurality of circuits connected via the intersatellite communication links is comprised of a synchronization burst, control data, and communication data as one information unit for each circuit.

Figure 11:
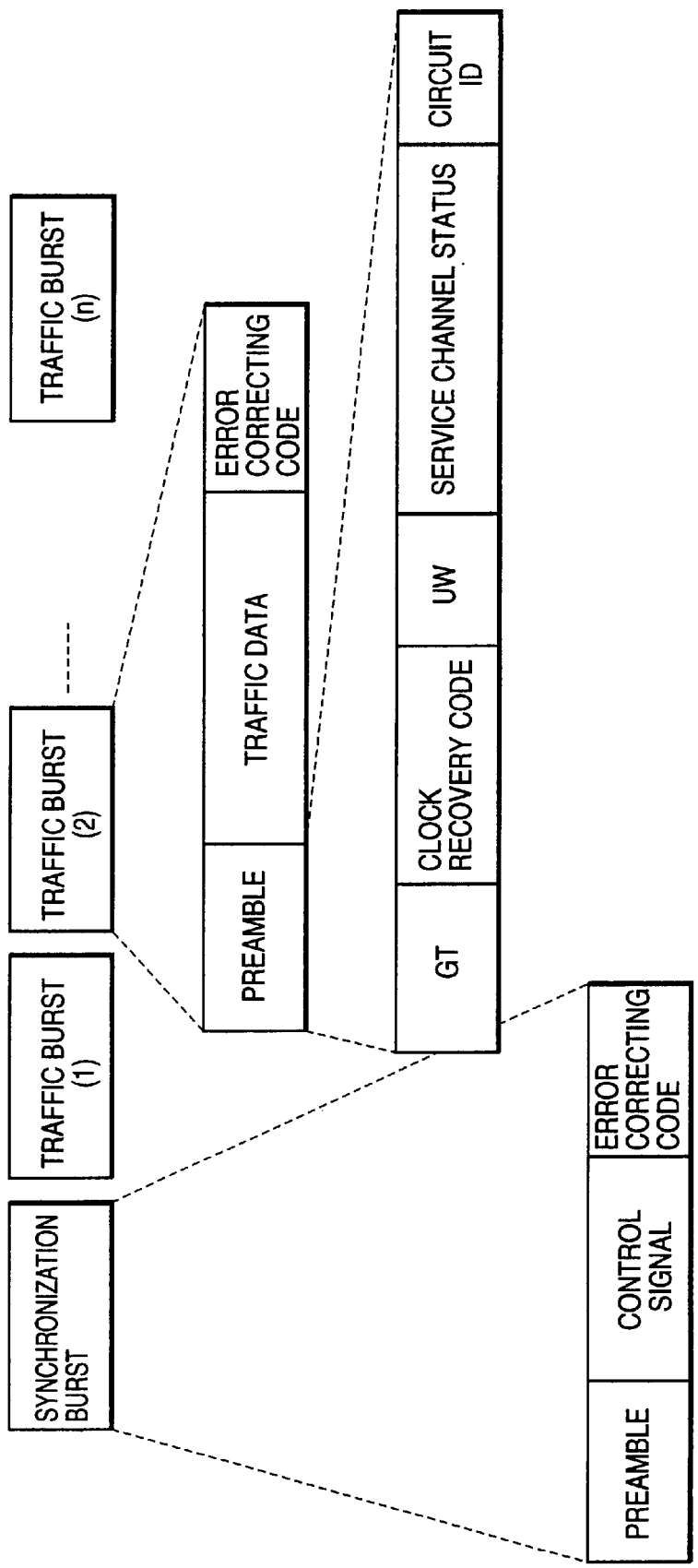
FIG. 11 is a diagram showing the details of communication data transmitted via an intersatellite communication link according to an embodiment of the present invention.

As shown in FIG. 11, more specifically, the communication frame is comprised of a synchronization burst and traffic bursts (1), (2), . . . , (n), and the synchronization burst is comprised of a preamble including information on a source station or the like, a control signal including a synchronization control signal for intersatellite communication and a monitor control signal for checking whether information is correctly transmitted during intersatellite communication, and an error correcting code signal. In addition, each of the traffic bursts is comprised of a preamble, traffic data, and an error correcting code signal, and the preamble in the traffic burst includes a GT, a clock recovery code, a unique word (UW), a service channel status identifying a channel through which a subscriber communicates with the satellite 10 while the subscriber is within the area of the coverage beams from the source satellite 10, and a circuit ID provided for each connected circuit. The service channel status includes the current frequency, a timing offset, and power level information.

Communication data for a plurality of circuits transmitted via one intersatellite communication link is included in the traffic data shown in FIG. 11. The traffic data is typically comprised only of communication data, which is shown in FIG. 12, but once the handoff preparation start notification has been issued by the controller 7, the traffic data has next handover-related data added thereto, which is shown in FIG. 12.

When the controller 7 determines that the calculated handover start time T–1 has passed, a first satellite 10 acting as the handover source issues the handoff preparation start notification. The intersatellite communication section 4 adds the next handover-related data to the traffic data and then sends the traffic data to a second satellite acting as a handover destination, before handover is started.

The second satellite sends communication data received from the first satellite 10 via the intersatellite communication link to a destined subscriber with which the second satellite 10 has an established link. Then, the second satellite establishes a new communication channel with the subscriber having established a link with the first satellite 10 and compares communication data received through this new communication link with the communication data having the next handover-related data added thereto received from the first satellite. For example, the second satellite determines from frame sequence numbers or the like whether these received communication data are continuous or duplicate before transmission. In this manner, the second satellite can instantaneously transmit frames received from the subscriber, to a receiving subscriber without interruption.

The detailed operation will further be described with reference to FIG. 8. Assuming that the amount of time required for the handover process is 1, when calculating the handover start time T–1 using the above-described method in the first satellite 10 acting as the handover source, the controller 7 determines the point of time T when handover is to be completed, and the intersatellite communication section 4 transmits a control signal with the handover completion time T added thereto to the second satellite 10 acting as the handover destination.

Subsequently, when the controller 7 determines that the handover start time T–1 has passed since the calculation of this time, the intersatellite communication section 4 adds next handover-related data to communication data received from the subscriber and then transmits these data to the second satellite 10 via the intersatellite communication link. The second satellite 10 stores the communication data received from the first satellite 10 in the data buffer 5, and the stored communication data is transferred to the controller 7 via the switching circuit 6.

Next, before the handover completion time T added to the control signal has passed since the reception of the control signal, the second satellite 10 uses the controller 7 to control the transmitter 1 and the receiver 2 in order to establish a new communication channel with the subscriber having an established link with the first satellite 10, and uses the receiver 2 to receive communication data sent from the subscriber.

When the handover completion time T has passed, the intersatellite communication section 4 of the second satellite 10 controls the switching circuit 6 to switch input of communication data to the controller 7 from the data buffer 5 to the receiver 2. The controller 7 compares communication data input from the data buffer 5 and having the next handover-related data added thereto with the communication data input from the receiver 2 to determine, for example, from frame sequence numbers whether these data are continuous or duplicate, before transmission. In this manner, the second satellite can instantaneously transmit the frame received from the sending subscriber, to the receiving subscriber.

In addition, upon determining that the handover completion time T, which has been determined based on the handover start time T–1, has passed since the calculation of the latter time, the controller 7 of the first satellite controls the transmitter 1 to release the communication link established with the subscriber.

As another example of means by which the first satellite releases the link established with the subscriber, the second satellite acting as the handover destination returns the next handover-related data received from the first satellite so that the data arrive at the handover completion time T.

On the other hand, the first satellite uses the intersatellite communication section 4 to receive the communication data returned from the second satellite, stores the received communication data in the data buffer 5, and inputs the communication data stored in the data buffer 5 to the controller 7 via the switching circuit 6. When, however, the communication data with the next handover-related data added thereto is input to the controller 7, the controller 7 transmits the communication data to the subscriber and then controls the transmitter 1 to release the communication link established with the subscriber.

Thus, the subscriber can switch reception from the communication data transmitted by the first satellite 10 to the communication data transmitted via the link newly established with the second satellite 10.

This technique for adding next handover-related data to traffic data is not implemented only between the satellite 10 and the following satellite 10 both navigating on the same orbit, but is applicable to two satellites 10 which are communicating with each other using the intersatellite communication link established therebetween.

A satellite 10 currently having a circuit established with the first satellite 10 and acting as the handover source is defined as the second satellite 10, and with a timing corresponding to the handover start time, the first satellite 10 adds next handover-related data to traffic data and transmits these data from the intersatellite communication section 4 to the second satellite 10.

Subsequently, a third satellite 10 acting as the handover destination establishes a new communication link with the subscriber having the established link with the first satellite 10, and sends communication data received from the subscriber, to the second satellite 10 via the intersatellite communication link. The second satellite 10 compares communication data already received from the first satellite 10 with the communication data received from the third satellite 10, and transmits the communication data as a sequence to the destined subscriber.

The operation will be explained in further detail with reference to FIG. 8. When the controller 7 of the first satellite 10 acting as the handover source determines the handover start time T−1 using the above method and then determines that the handover start time T−1 has passed, the intersatellite communication section 4 of the first satellite 10 sends a control signal with the handover completion time T added thereto to the second and third satellites 10. After the third satellite 10 has received the control signal and when the controller 7 of the third satellite 10 determines that the T−1 time has passed since the reception of the control signal from the first satellite 10, the controller 7 controls the transmitter 1 and the receiver 2 to establish a new link with the subscriber having the established link with the first satellite 10, and sends communication data received from this subscriber, from the intersatellite communication section 4 of the third satellite 10 to the second satellite 10 via the intersatellite communication link.

When the controller 7 of the first satellite 10 determines that the T−1 time has passed since the calculation of this handover start time, the intersatellite communication section 4 of the first satellite 10 adds next handover-related data to the communication data and then transmits these data to the second satellite 10 via the intersatellite communication link.

The second satellite 10 inputs the communication data received from the first and third satellites 10 by the intersatellite communication section 4 of the second satellite 10, to the controller 7 of the second satellite 10 via the data buffer 5 and the switching circuit 6. When, however, the controller 7 of the second satellite 10 determines the input of the communication data with the next handover-related data added thereto, the controller 7 of the second satellite 10 compares the communication data with the next handover-related data added thereto with the communication data received from the third satellite 10 to determine, for example, from frame sequence numbers whether these data are continuous or duplicate, and then controls the transmitter 1 to transmit the frames received from the subscriber without interruption.

In addition, upon determining that the handover completion time T, which has been determined based on the handover start time T−1, has passed since the calculation of the latter time, the controller 7 of the first satellite 10 controls the transmitter 1 to release the communication link established with the subscriber.

As another example of means by which the first satellite 10 releases the link established with the subscriber, the first satellite 10 transmits the communication data with the next handover-related data added thereto to the second satellite 10 as well as to the third satellite 10 as described above. The third satellite 10 retransmits the next handover-related data to the first satellite 10 and second satellite 10 so that the next handover-related data received from the first satellite 10 may arrive at the handover completion time T.

On the other hand, the first satellite 10 uses the intersatellite communication section 4 to receive the communication data received from the third satellite 10, stores the received communication data in the data buffer 5, and inputs the communication data stored in the data buffer 5 to the controller 7 via the switching circuit 6 of the first satellite 10. When, however, the communication data with the next handover-related data added thereto is input to the controller 7 of the first satellite 10, the controller 7 controls the transmitter 1 to transmit the communication data to the subscriber and then controls the transmitter 1 to release the communication link established with the subscriber.

Similarly, the second satellite 10 uses the intersatellite communication section 4 to receive the communication data received from the other satellites 10, stores the received communication data in the data buffer 5, and inputs the communication data stored in the data buffer 5 to the controller 7 via the switching circuit 6. When, however, the communication data with the next handover-related data added thereto is input from the third satellite 10 to the controller 7 of the first satellite 10, the controller 7 compares the next handover-related data from the third satellite 10 with the next handover-related data from the first satellite 10. Upon determining that these data are identical, the controller 7 recognizes that the handover destination is the third satellite 10 and controls the intersatellite communication section 4 to switch the destination of the communication data received from the destined subscriber or the other adjacent satellites 10, from the first satellite 10 to the third satellite 10.

Thus, the subscriber can switch the received communication data from the communication data transmitted by the first satellite 10 to the communication data transmitted by the third satellite 10, which acts as the handover destination.

Handover Sequence

Figure 13:
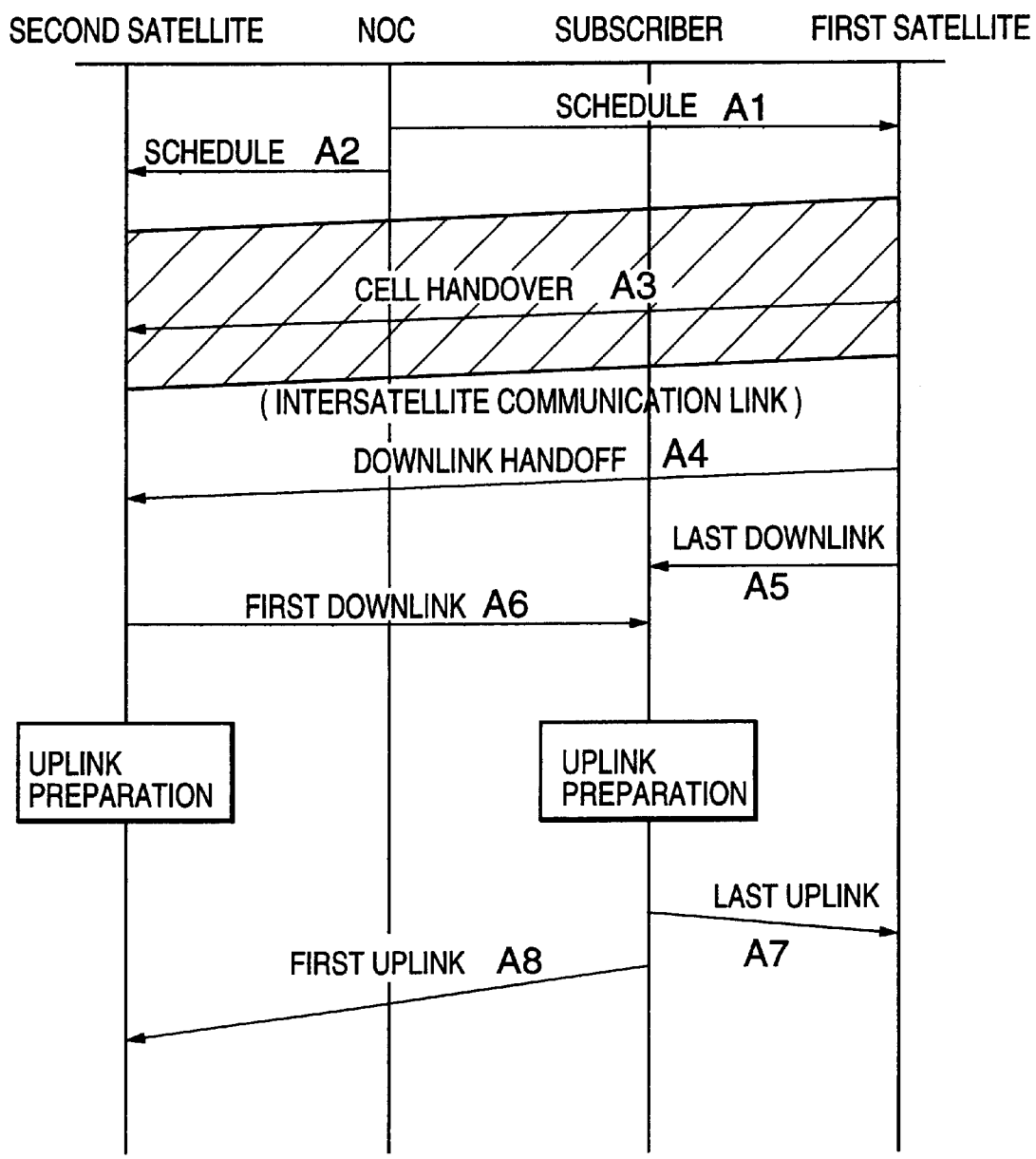
FIG. 13 is a sequence diagram showing handover in a satellite communications system according to the present invention.
Figure 14:
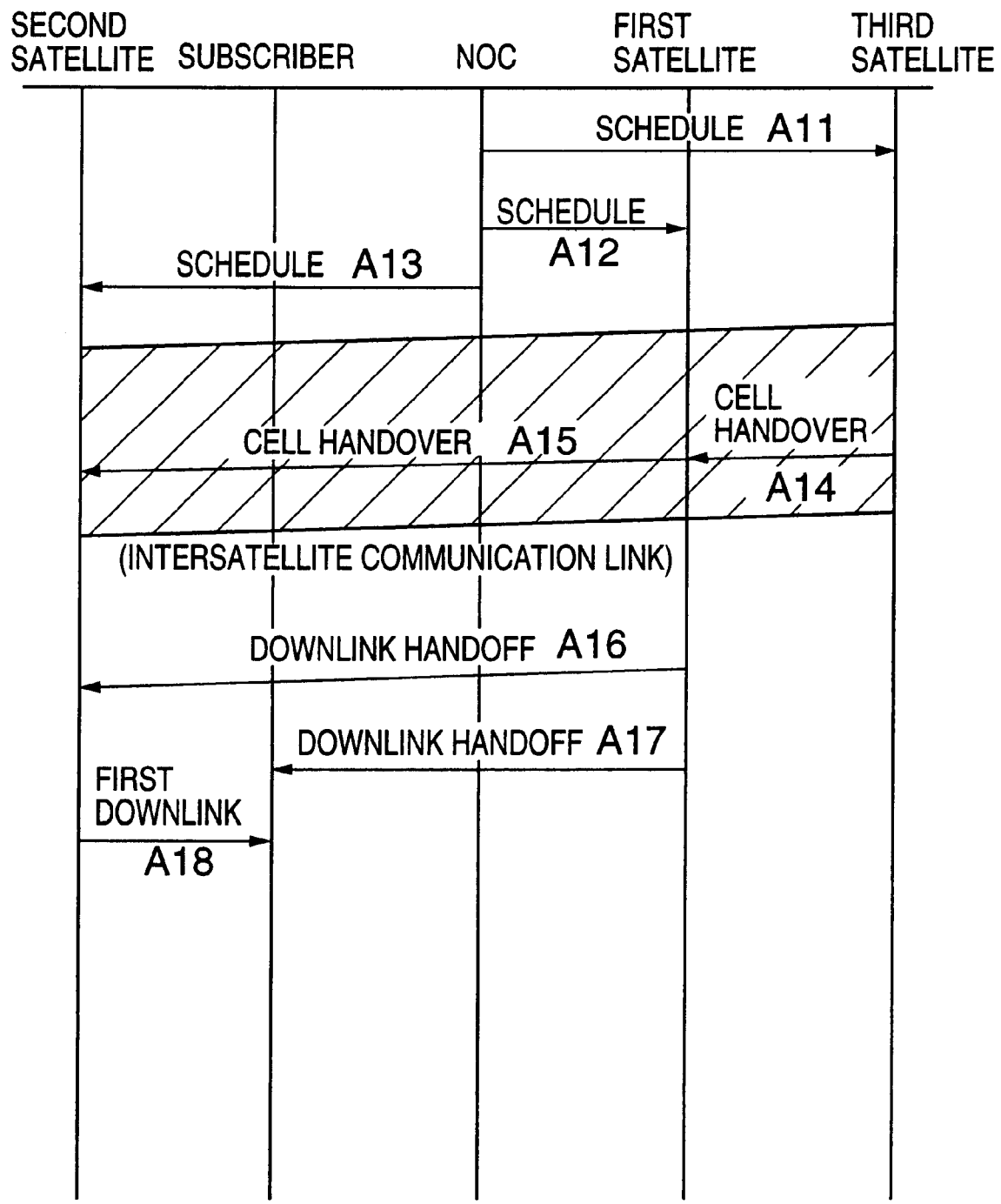
FIG. 14 is a sequence diagram shwoing handover in a satellite communications system according to the present invention.

Handover in the intersatellite communications system according to the present invention will be described with reference to the sequence diagrams as shown in FIGS. 13 and 14.

Handover between a first satellite 10 and a second satellites 10 following the first satellite 10 both arranged on the same orbit will be explained with reference to FIG. 13.

Referring to FIG. 13, the ground station (NOC) 11 causes all the satellites 10 to be controlled such that the controller 7 of each satellite 10 registers via the receiver 2, a physical location (east longitude, north latitude, or the like) immediately below the overhead satellite 10, a schedule indicating the corresponding point of time, physical locations (east longitude, north latitude, or the like) immediately below satellites 10 navigating before and after the overhead satellite 10 on the same orbit, a schedule indicating the corresponding point of time, physical locations (east longitude, north latitude, or the like) immediately below satellites 10 navigating adjacent to the overhead satellite 10, and a schedule indicating the corresponding point of time (see A1, A2 of FIG. 13).

The first satellite 10 calculates the handover start time to determine the handover completion time from the handover start time and adds the handover completion time to a control signal. The first satellite 10 then transmits the control signal to the second satellite 10, which acts as the handover destination. When the second satellite 10 receives this control signal, handover is started between the first satellite 10 and the second satellite 10 (A3), and a downlink message for a subscriber is transmitted from the first satellite 10 to the second satellite 10 (A4). The first satellite 10 transmits the last communication data to the subscriber through a communication link established therewith (A5), and the second satellite 10 subsequently sends the first communication data to the subscriber through a communication channel newly established therewith (A6).

Preparation is made between the second satellite 10 and the subscriber to establish a new up-link. Once the up-link has been established, the subscriber sends the last communication data to the first satellite 10 (A7) and then transmits the first communication data to the second satellite 10 (A8).

Next, handover between a first satellite 10, a second satellite 10 following the first satellite 10, and a third satellite preceding the first satellite 10 all arranged on the same orbit will be explained with reference to FIG. 14.

Referring to FIG. 14, the ground station (NOC) 11 causes all the satellites 10 to be controlled such that the controller 7 of each of the satellites 10 registers via the receiver 2, a physical location (east longitude, north latitude, or the like) immediately below the overhead satellite 10, a schedule indicating the corresponding point of time, physical locations (east longitude, north latitude, or the like) immediately below satellites 10 navigating before and after the overhead satellite 10 on the same orbit, a schedule indicating the corresponding point of time, physical locations (east longitude, north latitude, or the like) immediately below satellites 10 navigating adjacent to the overhead satellite 10, and a schedule indicating the corresponding point of time (A11, A12, A13).

When the first satellite 10 receives via the intersatellite communication link a control signal including the handover completion time which has been sent from the preceding third satellite 10, handover is carried out between the third satellite 10 and the first satellite 10 (A14).

According to this embodiment, if those sub-areas of areas covered by the first and third satellites 10 to which different subscribers communicating with each other belong are such that the same handover start time is calculated by these first and third satellites 10, that is, these sub-areas are each the i-th of the n divisional sub-areas obtained by dividing the corresponding area into n parts in the forward direction (see FIG. 7), then the first satellite 10 calculates the same handover start time as calculated by the third satellite 10, so that the handover between the first satellite 10 and the second satellite 10 is executed at the same time as the handover between the third satellite 10 and the first satellite 10 (A15).

When handover is started between the first satellite 10 and the second satellite 10, the first satellite 10 transmits a downlink handoff message for the subscriber to the second satellite 10 (A16). The first satellite 10 transmits the last communication data to the subscriber through a communication link established therewith (A17), and the second satellite 10 subsequently sends the first communication data to the subscriber through a communication channel newly established therewith (A18).

Figure 1:
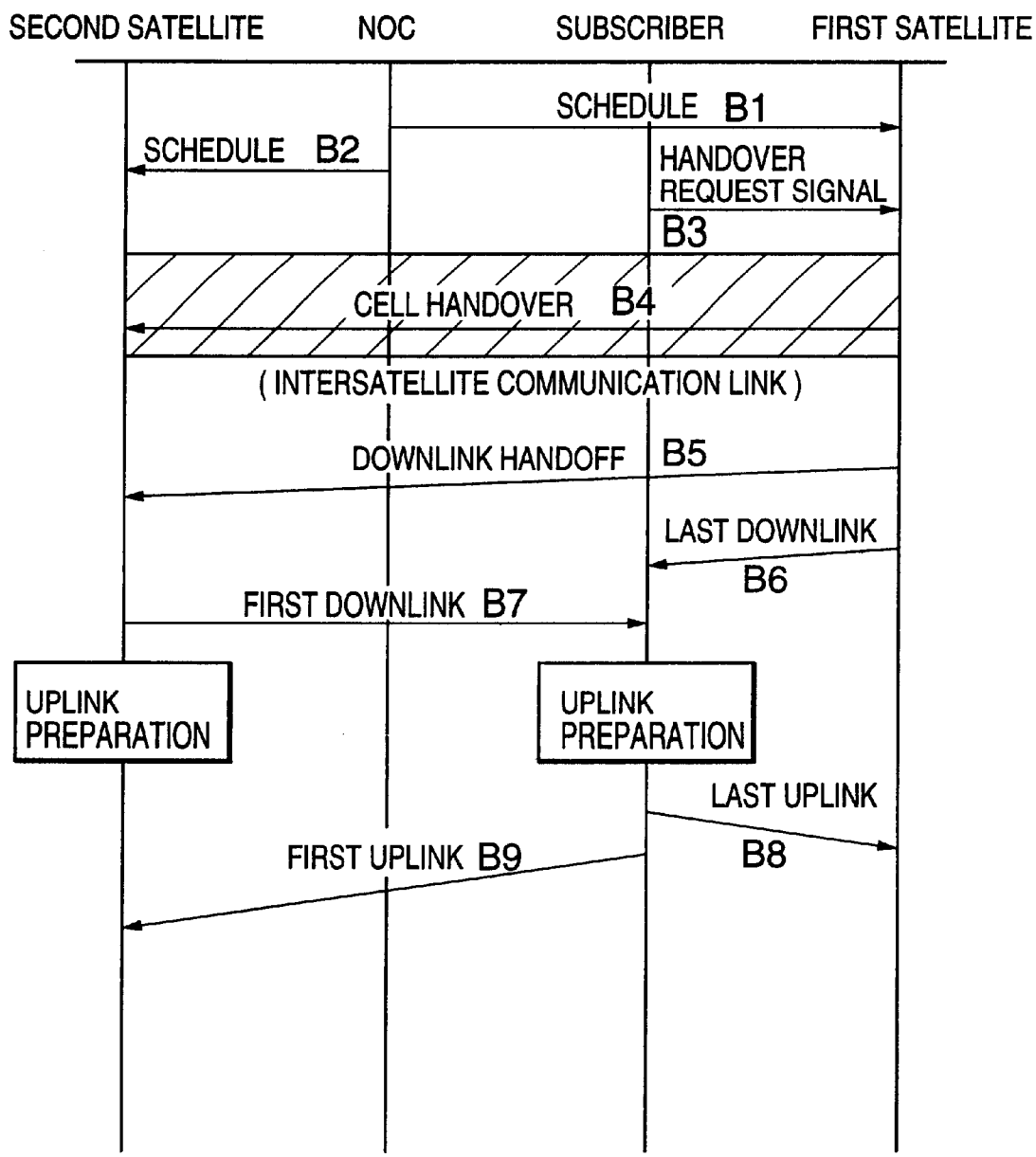
FIG. 1 is a sequence diagram for describing handover in a conventional satellite communications system.
Figure 2:
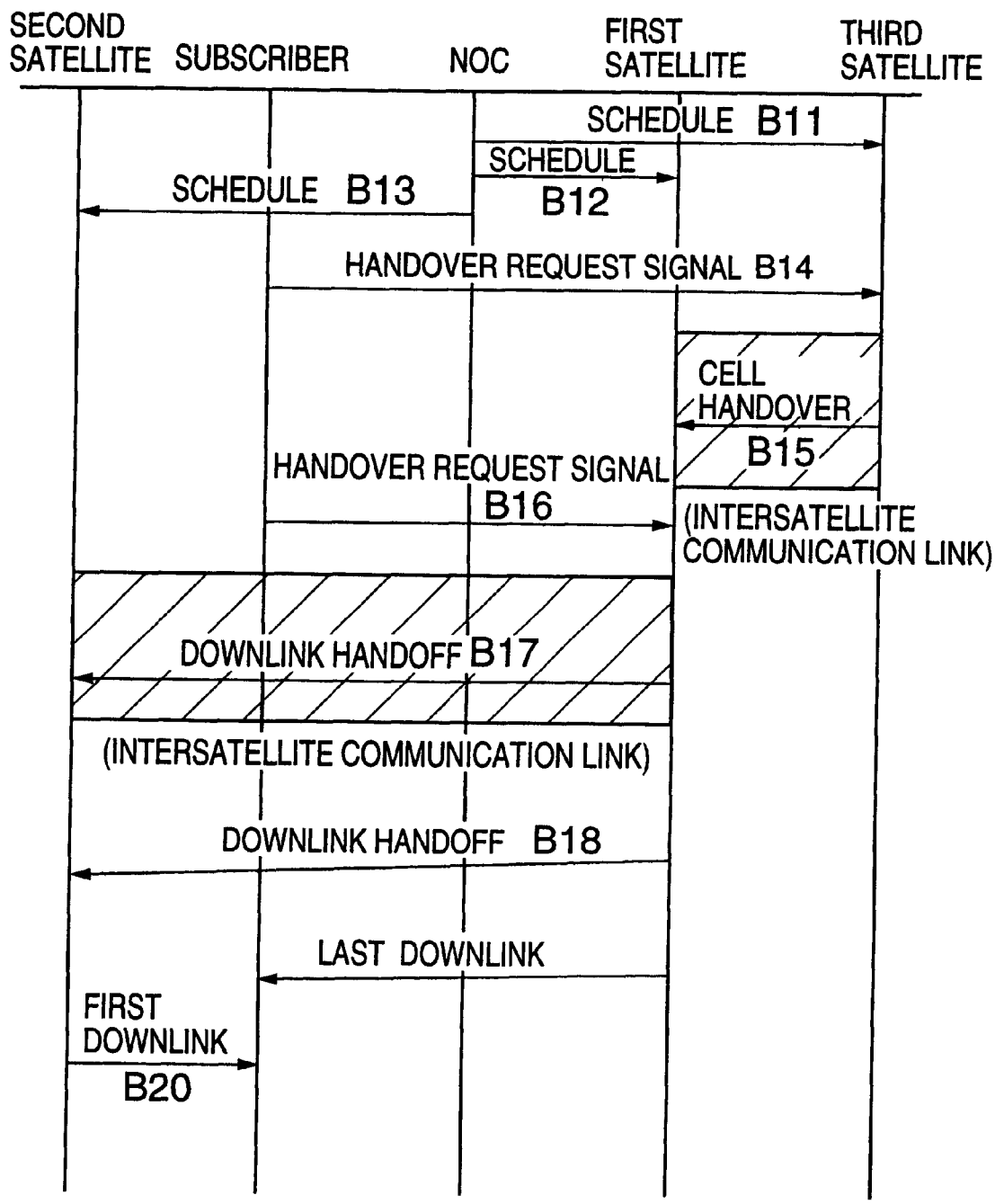
FIG. 2 is a sequence diagram for describing handover in a conventional satellite communications system.

As clearly seen from the above description based on the sequence diagrams in FIGS. 13 and 14, the satellite communications system according to the present invention can implement the handover process with a reduced amount of control signal transmissions between the handover source satellite and the subscriber, compared to the handover process of the conventional satellite communications system shown in FIGS. 1 and 2.

As clearly seen from the above description, according to the present invention, each satellite can autonomously calculate the handover start time for a subscriber whose location is known, based on the schedule information received from the ground station or previously registered in the controller thereof, in order to execute the handover process in accordance with the handover start time. Therefore, handover procedure starting with the handover request signal originated from a subscriber, a gateway, or the like can be eliminated to avoid errors in communication occurring during transmission of a large amount of data required for the handover process, thereby enabling preferable handover.

What is claimed is:

1. A satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites comprising:
a ground communication section for communicating with stations located in the coverage areas on the earth;
an intersatellite communication section for communicating with other satellites through intersatellite communications links; and
a controller controlling the ground and intersatellite communication sections to perform a handover process,
wherein
in a first satellite forming a coverage area in which the station is located, a first controller calculates a handover start time at which the handover process should be started for the station, and controls the intersatellite communication section so as to transmit a control signal having a handover completion time added thereto to an adjacent satellite that is to be a handover destination satellite, wherein the handover completion time is calculated from the handover start time, and
in a second satellite receiving the control signal having the handover completion time added thereto from the first satellite, a second controller performs the handover process by establishing a new communication link to the station before the handover completion time.

2. The satellite communications system according to claim 1, wherein, in the first satellite, the first controller releases the communication link used to communicate with the station at the handover completion time calculated from the handover start time.

3. The satellite communications system according to claim 1, wherein, in the first satellite, the first controller registers a size of a coverage area formed by each of the satellites, first schedule information indicating physical locations immediately below the first satellite according to a point of time provided to the first satellite, and second schedule information indicating physical locations immediately below the adjacent satellite according to a point of time provided to the adjacent satellite, wherein the first controller calculates the handover start time from a leaving time required for the physical location of the station to leave the coverage area of the first satellite and an entering time required for the physical location of the station to enter the coverage area of the adjacent satellite, wherein the leaving time and the entering time are calculated based on sizes of first and second coverage areas formed respectively by the first and adjacent satellites, the first and second schedule information, and the physical location of the station covered by the first satellite.

4. The satellite communications system according to claim 3, wherein, when the adjacent satellite is the second satellite following the first satellite on the non-stationary orbit, the leaving time is calculated by measuring a distance the station moves on the first coverage area of the first satellite which is a length of a straight line joining the physical location of the station with an intersection between an edge of the first coverage area and a straight line passing through the physical location of the station and parallel with a movement direction of the first coverage area with respect to the ground, and dividing the distance the station moves by a movement speed of the first coverage area, and the entering time is calculated by measuring a distance the station moves toward the second coverage area of the second satellite which is a length of a straight line joining the physical location of the station with an intersection between an edge of the second coverage area and a straight line passing through the physical location of the station and parallel with a movement direction of the first coverage area with respect to the ground, and dividing the distance the station moves by a movement speed of the second coverage area.

5. A satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite, each of the satellites comprising:
a ground communication section for communicating with stations on the earth;
an intersatellite communication section for communicating with other satellites through intersatellite communications links; and
a controller controlling the ground and intersatellite communication sections to perform a handover process,
wherein
in a first satellite forming a coverage area in which the station is located, a first controller calculates a handover start time at which the handover process should be started for the station, and controls a first intersatellite communication section so as to transmit a control signal having a handover completion time added thereto and communication data received from the station at the handover start time and having next handover-related data added thereto to an adjacent satellite that is to be a handover destination satellite, wherein the handover completion time is calculated from the handover start time, and
in a second satellite receiving from the first satellite the control signal having the handover completion time added thereto and the communication data having the next handover-related data added thereto, a second controller performs the handover process by establishing a new communication link to the station before the handover completion time, compares communication data received from the station using the new communication link with the next handover-related data to determine whether the communication data and the next handover-related data are in sequence, and controls second ground and intersatellite communication sections such that a sequence of communication data is received from the station and is transmitted toward an opposite-side station communicating with the station.

6. The satellite communications system according to claim 5, wherein, in the first satellite, the first controller releases the communication link used to communicate with the station at the handover completion time calculated from the handover start time.

7. The satellite communications system according to claim 5, wherein,
in the second satellite, the second controller controls the second intersatellite communication section such that the next handover-related data received from the first satellite is transmitted to the first satellite so that it is received by the first satellite at the handover completion time, and
in the first satellite, the first controller releases the communication link used to communicate with the station when having received the next handover-related data from the second satellite.

8. A satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite, each of the satellites comprising:
a ground communication section for communicating with stations on the earth;
an intersatellite communication section for communicating with other satellites through intersatellite communications links;
a storage device for storing data received from other satellites through the intersatellite communications links;
a selector for selecting one of data received by the ground communication section and data stored in the storage device; and
a controller controlling the ground and intersatellite communication sections and the selector to perform a handover process,
wherein in a first satellite forming a coverage area in which the station is located,
a first controller calculates a handover start time T−t at which the handover process should be started for the station, wherein T is a handover completion time and t is a time required for the handover process, and controls a first intersatellite communication section so as to transmit a control signal having the handover completion time T added thereto and communication data received from the station at the handover start time T−t and having next handover-related data added thereto to an adjacent satellite that is to be a handover destination satellite, wherein the handover completion time T is calculated from the handover start time T−t, and
in a second satellite receiving from the first satellite the control signal having the handover completion time T added thereto and the communication data having the next handover-related data added thereto,
a second controller performs the handover process by establishing a new communication link to the station before a lapse of the handover completion time T, inputing data from the second ground communication section using the new communication link, inputting data from a second storage device when the selector is switched by the second intersatellite communication section at the handover completion time T, comparing communication data received from the station using the new communication link with the next handover-related data to determine whether the communication data and the next handover-related data are in sequence, and controls second ground and intersatellite communication sections such that a sequence of communication data is received from the station and is transmitted toward an opposite-side station communicating with the station.

9. The satellite communications system according to claim 8, wherein, in the first satellite, the first controller releases the communication link used to communicate with the station at the handover completion time T calculated from the handover start time.

10. The satellite communications system according to claim 8, wherein, in the second satellite, the second controller controls the second intersatellite communication section such that the next handover-related data received from the first satellite is transmitted to the first satellite so that it is received by the first satellite at the handover completion time T, and in the first satellite, the first controller controls the first ground communication section so as to transmit last communication data to the station before releasing the communication link used to communicate with the station when having received the next handover-related data from the second satellite.

11. A satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites comprising:

a ground communication section for communicating with stations located in the coverage areas on the earth;

an intersatellite communication section for communicating with other satellites through intersatellite communications links; and a controller controlling the ground and intersatellite communication sections to perform a handover process, wherein in a first satellite forming a coverage area in which a station is located, a first controller calculates a handover start time at which the handover process should be started for the station, and controls the intersatellite communication section so as to transmit a control signal having a handover completion time added thereto to a second satellite that is to be a handover destination satellite adjacent to the first satellite using a first intersatellite communication link and a third satellite which is communicating with the first satellite using a second intersatellite communication link, wherein the handover completion time is calculated from the handover start time, and in the second satellite receiving the control signal having the handover completion time added thereto from the first satellite, a second controller performs the handover process by establishing a new communication link to the station before the handover completion time, receiving communication data from the station using the new communication link, and transmitting the received communication data to the third satellite using a third intersatellite communication link.

12. The satellite communications system according to claim 11, wherein, in the first satellite, the first controller releases the communication link used to communicate with the station at the handover completion time calculated from the handover start time.

13. The satellite communications system according to claim 11, wherein, in the first satellite, the first controller adds next handover-related data to communication data received from the station at the handover start time and controls the first intersatellite communication section so as to transmit the next handover-related data to the second satellite using the first intersatellite communication link, in the second satellite, the second controller controls the second intersatellite communication section such that the next handover-related data received from the first satellite is transmitted to the first satellite so that it is received by the first satellite at the handover completion time, and in the first satellite, the first controller releases the communication link used to communicate with the station when having received the next handover-related data from the second satellite.

14. The satellite communications system according to claim 11, wherein, in the third satellite, a third controller controls a third ground communication section so as to transmit communication data received from an opposite-side station communicating with the station to the second satellite at the handover start time, in the second satellite, the second controller controls the second ground communication section such that a new communication link to the station is established before the handover completion time and the communication data received from the third satellite is transmitted to the station.

15. The satellite communications system according to claim 11, wherein, in the first satellite, the first controller adds next handover-related data to communication data received from the station at the handover start time and controls the first intersatellite communication section so as to transmit the next handover-related data to the third satellite using the second intersatellite communication link, in the third satellite, the third controller compares communication data having the next handover-related data received from the first satellite station with the communication data received from the second satellite to determine whether these received communication data are in sequence, and controls third ground and intersatellite communication sections such that a sequence of communication data is received from the station and is transmitted toward the opposite-side station communicating with the station.

16. The satellite communications system according to claim 11, wherein, in the first satellite, the first controller adds next handover-related data to communication data received from the station at the handover start time and controls the first intersatellite communication section so as to transmit the next handover-related data to the second satellite using the first intersatellite communication link, in the second satellite, the second controller controls the second intersatellite communication section such that the next handover-related data received from the first satellite is transmitted to the third satellite so that it is received by the third satellite at the handover completion time, and in the third satellite, the third controller compares next handover-related data received from the first satellite station with the next handover-related data received from the second satellite to determine whether these received next handover-related data are identical to each other, and, if these received next handover-related data are identical, then the third controller determines that the second satellite is the handover destination satellite, and controls third ground and intersatellite communication sections such that a forwarding destination of communication data received from an opposite-side station communicating with the station is switched from the first satellite to the second satellite.

17. The satellite communications system according to claim 11, wherein the first controller calculates the handover start time by subtracting t from TA on condition that there are TA and TB satisfying a first expression:

$$TA > TB + t \quad (1),$$

where TA is a time required for the physical location of the station to leave a first coverage area formed by the first satellite, TB is a time required for the physical location of the station to be covered with a second coverage area formed by the second satellite, and t is a time required for the handover process to be completed.

18. The satellite communications system according to claim 17, wherein the first controller calculates the handover start time for the station by equally dividing an area satisfying the first expression (1) and covered by the first satellite in a direction perpendicular to a movement direction of the first coverage area, and determining which of divisional areas the station is located in.

19. The satellite communications system according to claim 11, wherein the first controller calculates the handover start time for a handover destination satellite by subtracting t from Ta, wherein the hanover destination satellite is determined to be a satellite satisfying a second expression:

$$Ta > Tb + t, Tc + t, \ldots, Tn + t \quad (2),$$

where Ta is a time required for the physical location of the station to leave a first coverage area formed by the first satellite, Tb, Tc, . . . Tn are times required for the physical location of the station to be covered with coverage areas formed by adjacent satellites, respectively, and t is a time required for the handover process to be completed.

20. The satellite communications system according to claim 19, wherein, when a plurality of adjacent satellites satisfy the second expression (2), an adjacent satellite having the largest value of Ti+t is selected as the handover destination satellite.

21. A satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites comprising:
  a ground communication section f or communicating with stations located in the coverage areas on the earth;
  an intersatellite communication section for communicating with other satellites through intersatellite communications links; and
  a controller controlling the ground and intersatellite communication sections to perform a handover process,
    wherein in a first satellite forming a coverage area in which the station is located,
  a first controller calculates a handover start time T−t at which the handover process should be started for the station, wherein T is a handover completion time and t is a time required for the handover process, controls a first intersatellite communication section so as to transmit a control signal having the handover completion time T added thereto to a second satellite that is to be a handover destination satellite adjacent to the first satellite using a first intersatellite communication link and a third satellite which is communicating with the first satellite using a second intersatellite communication link, and controls the first intersatellite communication section so as to transmit first communication data having next handover-related data added thereto to the third satellite at the handover star time T−t, wherein the handover completion time is calculated from the handover start time, and in the second satellite receiving the control signal having the handover completion time T added thereto from the first satellite, a second controller performs the handover process by establishing a new communication link to the station before the handover start time T−t, and transmitting second communication data to the third satellite using a third intersatellite communication link, wherein the second communication data is received from the station using the new communication link, in the third satellite receiving the first communication data from the first satellite and the second communication data from the second satellite, a third controller compares the first communication data having the next handover-related data added thereto with the second communication data to determine whether these received communication data are in sequence, and controls third ground and intersatellite communication sections such that a sequence of communication data received from the station is transmitted toward an opposite-side station communicating with the station.

22. The satellite communications system according to claim 21, wherein, in the first satellite, the first controller releases the communication link used to communicate with the station at the handover completion time T calculated from the handover start time T−t.

23. The satellite communications system according to claim 21, wherein,
  in the second satellite, the second controller controls the second intersatellite communication section such that the next handover-related data received from the first satellite is transmitted to the first satellite so that it is received by the first satellite at the handover completion time T, and
  in the first satellite, the first controller controls the first ground communication section so as to transmit last communication data to the station before releasing the communication link used to communicate with the station when having received the next handover-related data from the second satellite.

24. The satellite communications system according to claim 21, wherein,
  in the first satellite, the first controller adds next handover-related data to communication data received from the station at the handover start time T−t and controls the first intersatellite communication section so as to transmit the communication data having the next handover-related data added thereto to the second satellite using the first intersatellite communication link,
  in the second satellite, the second controller controls the second intersatellite communication section such that the next handover-related data received from the first satellite is transmitted to the third satellite so that it is received by the third satellite at the handover completion time T, and in the third satellite, the third controller compares next handover-related data received from the first satellite station with the next handover-related data received from the second satellite to determine whether these received next handover-related data are identical to each other, and, if these received next handover-related data are identical, then the third controller determines that the second satellite is the handover destination satellite, and controls third ground and intersatellite communication sections such that a forwarding destination of communication data received from an opposite-side station communicating with the station is switched from the first satellite to the second satellite.

25. A handover processing method in a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites including:
   a ground communication section for communicating with stations located in the coverage areas on the earth;
   an intersatellite communication section for communicating with other satellites through intersatellite communications links; and
   a controller controlling the ground and intersatellite communication sections to perform a handover process,
the method comprising the steps of:
   at a first satellite forming a coverage area in which the station is located,
     a) calculating a handover start time at which the handover process should be started for the station;
     b) transmitting a control signal having a handover completion time added thereto to an adjacent satellite that is to be a handover destination satellite, wherein the handover completion time is calculated from the handover start time; and
   at a second satellite receiving the control signal having the handover completion time added thereto from the first satellite,
     c) performing the handover process by establishing a new communication link to the station before the handover completion time.

26. The handover processing method according to claim 25, further comprising the steps of:
at the first satellite,
releasing the communication link used to communicate with the station at the handover completion time calculated from the handover start time.

27. The handover processing method according to claim 25, further comprising the step of:
at the first satellite,
registering a size of a coverage area formed by each of the satellites, first schedule information indicating physical locations immediately below the first satellite according to a point of time provided to the first satellite, and second schedule information indicating physical locations immediately below the adjacent satellite according to a point of time provided to the adjacent satellite, wherein, in the step (a), the handover start time is calculated from a leaving time required for the physical location of the station to leave the coverage area of the first satellite and an entering time required for the physical location of the station to enter the coverage area of the adjacent satellite, wherein the leaving time and the entering time are calculated based on sizes of first and second coverage areas formed respectively by the first and adjacent satellites, the first and second schedule information, and the physical location of the station covered by the first satellite.

28. The handover processing method according to claim 27, wherein, when the adjacent satellite is the second satellite following the first satellite on the non-stationary orbit,
the leaving time is calculated by measuring a distance the station moves on the first coverage area of the first satellite which is a length of a straight line joining the physical location of the station with an intersection between an edge of the first coverage area and a straight line passing through the physical location of the station and parallel with a movement direction of the first coverage area with respect to the ground, and dividing the distance the station moves by a movement speed of the first coverage area, and
the entering time is calculated by measuring a distance the station moves toward the second coverage area of the second satellite which is a length of a straight line joining the physical location of the station with an intersection between an edge of the second coverage area and a straight line passing through the physical location of the station and parallel with a movement direction of the first coverage area with respect to the ground, and dividing the distance the station moves by a movement speed of the second coverage area.

29. The handover processing method according to claim 27, wherein in the step (a), the handover start time is calculated by subtracting t from TA on condition that there are TA and TB satisfying a first expression:

$$TA > TB + t \qquad (1),$$

where TA is a time required for the physical location of the station to leave a first coverage area formed by the first satellite, TB is a time required for the physical location of the station to be covered with a second coverage area formed by the second satellite, and t is a time required for the handover process to be completed.

30. The handover processing method according to claim 29, wherein in the step (a), the handover start time is calculated for the station by equally dividing an area satisfying the first expression (1) and covered by the first satellite in a direction perpendicular to a movement direction of the first coverage area, and determining which of divisional areas the station is located in.

31. The handover processing method according to claim 29, wherein in the step (a), the handover start time is calculated for a handover destination satellite by subtracting t from Ta, wherein the hanover destination satellite is determined to be a satellite satisfying a second expression:

$$Ta > Tb + t,\ Tc + t,\ \ldots,\ Tn + t \qquad (2),$$

where Ta is a time required for the physical location of the station to leave a first coverage area formed by the first satellite, Tb, Tc, . . . Tn are times required for the physical location of the station to be covered with coverage areas formed by adjacent satellites, respectively, and t is a time required for the handover process to be completed.

32. The handover processing method according to claim 31, wherein, when a plurality of adjacent satellites satisfy the second expression (2), an adjacent satellite having the largest value of Ti+t is selected as the handover destination satellite.

33. A handover processing method in a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite, each of the satellites comprising:
a ground communication section for communicating with stations on the earth;
an intersatellite communication section for communicating with other satellites through intersatellite communications links; and
a controller controlling the ground and intersatellite communication sections to perform a handover process,
the method comprising the steps of:
at a first satellite forming a coverage area in which the station is located,
a) calculating a handover start time at which the handover process should be started for the station;
b) transmitting a control signal having a handover completion time added thereto and communication data received from the station at the handover start time and having next handover-related data added thereto to an adjacent satellite that is to be a handover destination satellite, wherein the handover completion time is calculated from the handover start time;
at a second satellite receiving from the first satellite the control signal having the handover completion time added thereto and the communication data having the next handover-related data added thereto,
c) establishing a new communication link to the station before the handover completion time;
d) comparing communication data received from the station using the new communication link with the next handover-related data to determine whether the communication data and the next handover-related data are in sequence;
e) receiving a sequence of communication data from the station; and
f) transmitting the sequence of communication data toward an opposite-side station communicating with the station.

34. The handover processing method according to claim 33, further comprising the steps of:
at the first satellite,
releasing the communication link used to communicate with the station at the handover completion time calculated from the handover start time.

35. The handover processing method according to claim 33, further comprising the steps of:
at the second satellite,
transmitting the next handover-related data received from the first satellite to the first satellite so that it is received by the first satellite at the handover completion time; and
at the first satellite,
releasing the communication link used to communicate with the station when having received the next handover-related data from the second satellite.

36. A handover processing method in a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite, each of the satellites comprising:
a ground communication section for communicating with stations on the earth;
an intersatellite communication section for communicating with other satellites through intersatellite communications links;
a storage device for storing data received from other satellites through the intersatellite communications links;
a selector for selecting one of data received by the ground communication section and data stored in the storage device; and
a controller controlling the ground and intersatellite communication sections and the selector to perform a handover process,
at a first satellite forming a coverage area in which the station is located,
a) calculating a handover start time T–t at which the handover process should be started for the station, wherein T is a handover completion time and t is a time required for the handover process;
b) transmitting a control signal having the handover completion time T added thereto and communication data received from the station at the handover start time T–t and having next handover-related data added thereto to an adjacent satellite that is to be a handover destination satellite, wherein the handover completion time T is calculated from the handover start time T–t;
at a second satellite receiving from the first satellite the control signal having the handover completion time T added thereto and the communication data having the next handover-related data added thereto,
c) establishing a new communication link to the station before a lapse of the handover completion time T,
d) inputing data from the second ground communication section using the new communication link;
e) inputting data from a second storage device when the selector is switched by the second intersatellite communication section at the handover completion time T;
f) comparing communication data received from the station using the new communication link with the next handover-related data to determine whether the communication data and the next handover-related data are in sequence;
g) receiving a sequence of communication data from the station; and
h) transmitting the sequence of communication data toward an opposite-side station communicating with the station.

37. The handover processing method according to claim 36, further comprising the step of:
at the first satellite,
releasing the communication link used to communicate with the station at the handover completion time T calculated from the handover start time.

38. The handover processing method according to claim 36, further comprising the steps of:
at the second satellite,
transmitting the next handover-related data received from the first satellite to the first satellite so that it is received by the first satellite at the handover completion time T;
at the first satellite,
transmitting last communication data to the station before releasing the communication link used to communicate with the station, when having received the next handover-related data from the second satellite.

39. A handover processing method in a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link,
each of the satellites comprising:
a ground communication section for communicating with stations located in the coverage areas on the earth;
an intersatellite communication section for communicating with other satellites through intersatellite communications links; and
a controller controlling the ground and intersatellite communication sections to perform a handover process,
the method comprising the steps of:
at a first satellite forming a coverage area in which a station is located,
a) calculating a handover start time at which the handover process should be started for the station;
b) transmitting a control signal having a handover completion time added thereto to a second satellite that is to be a handover destination satellite adjacent to the first satellite using a first intersatellite communication link and a third satellite which is communicating with the first satellite using a second intersatellite communication link, wherein the handover completion time is calculated from the handover start time;
at the second satellite receiving the control signal having the handover completion time added thereto from the first satellite,
c) performing the handover process by establishing a new communication link to the station before the handover completion time;
d) receiving communication data from the station using the new communication link; and
e) transmitting the received communication data to the third satellite using a third intersatellite communication link.

40. The handover processing method according to claim 39, further comprising the step of:
at the first satellite,
releasing the communication link used to communicate with the station at the handover completion time calculated from the handover start time.

41. The handover processing method according to claim 39, further comprising the steps of:
at the first satellite,
adding next handover-related data to communication data received from the station at the handover start time; and transmitting the next handover-related data to the second satellite using the first intersatellite communication link;
at the second satellite,
transmitting the next handover-related data received from the first satellite to the first satellite so that it is received by the first satellite at the handover completion time; and
at the first satellite,
releasing the communication link used to communicate with the station when having received the next handover-related data from the second satellite.

42. The handover processing method according to claim 39, further comprising the steps of:
at the third satellite,
transmitting communication data received from an opposite-side station communicating with the station to the second satellite at the handover start time:
at the second satellite,
establishing a new communication link to the station before the handover completion time; and
transmitting the communication data received from the third satellite to the station.

43. The handover processing method according to claim 39, further comprising the steps of:
at the first satellite,
adding next handover-related data to communication data received from the station at the handover start time; and
transmitting the next handover-related data to the third satellite using the second intersatellite communication link;
at the third satellite,
comparing communication data having the next handover-related data received from the first satellite station with the communication data received from the second satellite to determine whether these received communication data are in sequence;
receiving a sequence of communication data from the station; and
transmitting the sequence of communication data toward the opposite-side station communicating with the station.

44. The handover processing method according to claim 39, further comprising the steps of:
at the first satellite,
adding next handover-related data to communication data received from the station at the handover start time; and
transmitting the next handover-related data to the second satellite using the first intersatellite communication link;
at the second satellite,
transmitting the next handover-related data received from the first satellite to the third satellite so that it is received by the third satellite at the handover completion time;
at the third satellite,
comparing next handover-related data received from the first satellite station with the next handover-related data received from the second satellite to determine whether these received next handover-related data are identical to each other;
when these received next handover-related data are identical, determining that the second satellite is the handover destination satellite; and switching a forwarding destination of communication data received from an opposite-side station communicating with the station from the first satellite to the second satellite.

45. A handover processing method in a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, each of the satellites comprising:
- a ground communication section for communicating with stations located in the coverage areas on the earth;
- an intersatellite communication section for communicating with other satellites through intersatellite communications links; and
- a controller controlling the ground and intersatellite communication sections to perform a handover process, the method comprising the steps of:
at a first satellite forming a coverage area in which the station is located,
  a) calculating a handover start time T−t at which the handover process should be started for the station, wherein T is a handover completion time and t is a time required for the handover process;
  b) transmitting a control signal having the handover completion time T added thereto to a second satellite that is to be a handover destination satellite adjacent to the first satellite using a first intersatellite communication link and a third satellite which is communicating with the first satellite using a second intersatellite communication link;
  c) transmitting first communication data having next handover-related data added thereto to the third satellite at the handover star time T−t, wherein the handover completion time is calculated from the handover start time;
at the second satellite receiving the control signal having the handover completion time T added thereto from the first satellite,
  d) establishing a new communication link to the station before the handover start time T−t;
  e) transmitting second communication data to the third satellite using a third intersatellite communication link, wherein the second communication data is received from the station using the new communication link;
at the third satellite receiving the first communication data from the first satellite and the second communication data from the second satellite,
  f) comparing the first communication data having the next handover-related data added thereto with the second communication data to determine whether these received communication data are in sequence; and
  g) transmitting a sequence of communication data received from the station toward an opposite-side station communicating with the station.

46. The handover processing method according to claim 45, further comprising the step of:
at the first satellite,
releasing the communication link used to communicate with the station at the handover completion time T calculated from the handover start time T−t.

47. The handover processing method according to claim 45, further comprising the step of:
at the second satellite,
transmitting the next handover-related data received from the first satellite to the first satellite so that it is received by the first satellite at the handover completion time T;
at the first satellite,
transmitting last communication data to the station before releasing the communication link used to communicate with the station when having received the next handover-related data from the second satellite.

48. The handover processing method according to claim 45, further comprising the step of:
at the first satellite,
adding next handover-related data to communication data received from the station at the handover start time T−t;
transmitting the communication data having the next handover-related data added thereto to the second satellite using the first intersatellite communication link;
at the second satellite,
transmitting the next handover-related data received from the first satellite to the third satellite so that it is received by the third satellite at the handover completion time T;
at the third satellite,
comparing next handover-related data received from the first satellite station with the next handover-related data received from the second satellite to determine whether these received next handover-related data are identical to each other;
when these received next handover-related data are identical, determining that the second satellite is the handover destination satellite; and
switching a forwarding destination of communication data received from an opposite-side station communicating with the station from the first satellite to the second satellite.

49. A handover processing method in a satellite communications system using a plurality of satellites which are arranged on at least one non-stationary orbit, wherein a plurality of satellites on a non-stationary orbit emit beams to form a plurality of coverage areas covering a circumference of the earth and a station located in a coverage area formed by a satellite communicates with the satellite using an established communication link, the method comprising the steps of:
previously registering schedule information in each of the satellites, the schedule information including a radius of a coverage area thereof, a point of time provided thereto, and physical locations of a center point of the coverage area thereof according to the point of time;
determining a physical location of a first station which is located in a first coverage area of a first satellite;
calculating a leaving time required for the first satellite to leave the first coverage area from the physical location of the first station, the radius and a physical location of the center point of the first coverage area at a current point of time;
calculating a handover start time based on a difference between the leaving time and a predetermined handover time required for handover process; and
transmitting a control signal including the leaving time to an adjacent satellite to perform the handover process.

* * * * *